United States Patent
Mimura et al.

(10) Patent No.: US 8,301,773 B2
(45) Date of Patent: Oct. 30, 2012

(54) SERVER MANAGEMENT PROGRAM, SERVER MANAGEMENT METHOD, AND SERVER MANAGEMENT APPARATUS

(75) Inventors: Toshihiro Mimura, Kawasaki (JP); Hideki Nozaki, Kawasaki (JP); Shuichi Chiba, Kawasaki (JP); Hideo Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 674 days.

(21) Appl. No.: 11/788,148

(22) Filed: Apr. 18, 2007

(65) Prior Publication Data
US 2007/0204030 A1 Aug. 30, 2007

Related U.S. Application Data

(63) Continuation of application No. PCT/JP2004/015527, filed on Oct. 20, 2004.

(51) Int. Cl.
*G06F 15/173* (2006.01)
(52) U.S. Cl. .......... 709/226; 370/351; 370/401
(58) Field of Classification Search .......... 709/226
See application file for complete search history.

(56) References Cited

U.S. PATENT DOCUMENTS

| | | | | |
|---|---|---|---|---|
| 5,867,657 | A * | 2/1999 | Bolosky et al. | 725/115 |
| 6,779,016 | B1 * | 8/2004 | Aziz et al. | 709/201 |
| 7,313,614 | B2 * | 12/2007 | Considine et al. | 709/223 |
| 7,426,191 | B2 * | 9/2008 | Salesky et al. | 370/260 |
| 7,895,264 | B2 * | 2/2011 | Douglass et al. | 709/203 |
| 2003/0126202 | A1 * | 7/2003 | Watt | 709/203 |
| 2004/0015581 | A1 * | 1/2004 | Forbes | 709/224 |
| 2004/0088412 | A1 * | 5/2004 | John et al. | 709/226 |
| 2005/0002405 | A1 * | 1/2005 | Gao | 370/401 |
| 2006/0294251 | A1 * | 12/2006 | Cocotis et al. | 709/229 |
| 2007/0244999 | A1 * | 10/2007 | Hamanaka et al. | 709/220 |
| 2007/0274282 | A1 * | 11/2007 | Deak et al. | 370/351 |

(Continued)

FOREIGN PATENT DOCUMENTS
EP 1 079 301 2/2001
(Continued)

OTHER PUBLICATIONS

Georgios Raptis et al.; "Implementation of a Cluster of Clusters to deliver application-redundancy and load-balancing;" Brunel University; May 2003; pp. 3-72.

(Continued)

*Primary Examiner* — Firmin Backer
*Assistant Examiner* — Hamza Algibhah
(74) *Attorney, Agent, or Firm* — Greer, Burns & Crain, Ltd.

(57) ABSTRACT

A server management program, a server management method, and a server management apparatus that allows an environment for providing a service corresponding to a server group for executing processing in cooperation with a server computer to be formed automatically in a standby server computer added to the server group. An image data collector collects disk image data from server computers and stores the data in an image data storage section. When an instruction to add a server computer to a server group is received, an image data addition section obtains the disk image data from the image data storage section and copies the data onto a disk of the server computer to be added. A configuration setup section sets up unique information of a mating server computer having a processing request relationship, in the server computer to be added, in accordance with processing request relationships among the server computers included in the different server groups.

6 Claims, 22 Drawing Sheets

U.S. PATENT DOCUMENTS

2008/0270610 A1* 10/2008 John et al. .................... 709/226

FOREIGN PATENT DOCUMENTS

| JP | 2000-78169 | 3/2000 |
| JP | 2000-078169 | 3/2000 |
| JP | 2001-067225 | 3/2001 |
| JP | 2002-16324-1 | 6/2002 |
| JP | 2002-183106 | 6/2002 |
| JP | 2002-288138 | 10/2002 |
| JP | 2004-110791 | 4/2004 |
| JP | 2004-178290 | 6/2004 |
| WO | WO 01/14987 | 3/2001 |

OTHER PUBLICATIONS

Japanese Office Action issued on Jul. 20, 2010, in corresponding Japanese Application No. 2006-542139.
Grid Computing Approaches Toward Resource Utility, OPEN Enterprise magazine; Japan, Socius Japan, Inc.; May 1, 2004; vol. 2, No. 5, pp. 46 to 49.
Japanese Office Action issued in corresponding Japanese Application No. 2006-542139, issued Apr. 26, 2011.

* cited by examiner

SERVER MANAGEMENT PROGRAM, SERVER MANAGEMENT METHOD, AND SERVER MANAGEMENT APPARATUS

This application is a continuing application, filed under 35 U.S.C. §111(a), of International Application PCT/JP2004/015527, filed Oct. 20, 2004.

BACKGROUND OF THE INVENTION

1. Field of the Invention

The present invention relates to server management programs, server management methods, and server management apparatuses for managing an application operating on a server computer, and particularly to a server management program, a server management method, and a server management apparatus for grouping and managing a plurality of server computers.

2. Description of the Related Art

When a service is provided to a client, a plurality of server computers can perform distributed processing. In this processing, a load balancer assigns a request from the client to one of the server computers.

In the following description, a function name followed by "server" means a function for providing a service by means of application software operating on a computer. A "server computer" means a computer which executes application software for providing a service.

During system operation, the amount of requested service processing may get close to the limitation of system throughput. In that case, the throughput can be enhanced by adding a server computer to a group of server computers for providing a service (server group), so that the amount of processing will not exceed the system throughput.

If the server computer is added to the server group in response to an operation input from the user, the addition of the server computer may not keep up with an increase in processing load. So, a system for monitoring a service request to a server cluster has been proposed. The system adds a standby server computer provided in advance to the server cluster when a demand for the service exceeds the upper limit (refer to Japanese Unexamined Patent Application Publication No. 2002-163241 (See paragraphs [0028] and [0029]).

A standby server computer can be automatically added to a server group if the configuration of the standby server computer is set up in advance. If the standby server computer can be prepared for a special service, the system as described in patent document 1 is possible.

In a system for providing a plurality of services, preparing a standby server computer for each service is a waste of resources. So, another idea is to provide a common standby server computer for a plurality of services and to add the server computer to a server group for providing a service when the load of the service becomes excessively large. When the target server group is determined, a server application for the server group must be installed on the server computer.

Because the application and the like must be arranged and set up for the standby server computer after the addition to the server group is determined, it would take a long time until the actual operation can start. In a multilayer server system in which a service is provided by a plurality of server applications working in cooperation with one another (such as a service provided by a web server and an application server operating at the request of the web server), a configuration that includes information on other server computers related to the added server computer must be set up. Accordingly, the configuration cannot be set up in advance in a system in which a server computer would be dynamically added to or deleted from the target server group.

SUMMARY OF THE INVENTION

In view of the foregoing, it is an object of the present invention to provide a system management program for enabling a configuration for providing a service in accordance with a service group for executing processing in cooperation with another server computer to be automatically set up in a server computer to be added to the server group.

To accomplish the above object, according to the present invention, there is provided a server management program for grouping and managing a plurality of server computers in server groups. The server management program allows a computer to function as: an image data collector for collecting disk image data from a server computer included in each of the server groups and for storing the disk image data in an image data storage unit; an image data addition section for, when receiving an instruction to add a server computer of the server computers to an addition-target server group of the server groups, obtaining the disk image data collected from the addition-target server group, from the image data storage section, and for storing the disk image data in a memory of the server computer to be added; and a configuration setup section for setting up unique information of a mating server computer having a processing request relationship, in the server computer to be added, in accordance with processing request relationships among the server computers included in the different server groups.

To accomplish the above object, there is also provided a server management method for grouping and managing a plurality of server computers in server groups. The server management method comprises the steps of: collecting disk image data from a server computer included in each of the server groups and storing the disk image data in an image data storage section; obtaining, when receiving an instruction to add a server computer of the server computers to an addition-target server group of the server groups, the disk image data collected from the addition-target server group, from the image data storage section, and storing the disk image data in the server computer to be added; and setting up unique information of a mating server computer having a processing request relationship, in the server computer to be added, in accordance with processing request relationships among the server computers included in the different server groups.

To accomplish the above object, there is further provided a server management apparatus for grouping and managing a plurality of server computers in server groups. The server management apparatus comprises: an image data collector for collecting disk image data from a server computer included in each of the server groups and for storing the disk image data in an image data storage section; an image data addition section for, when receiving an instruction to add a server computer of the server computers to an addition-target server group of the server groups, obtaining the disk image data collected from the addition-target server group, from the image data storage section, and for storing the disk image data in a memory of the server computer to be added; and a configuration setup section for setting up unique information of a mating server computer having a processing request relationship, in the server computer to be added, in accordance with processing request relationships among the server computers included in the different server groups.

The above and other objects, features and advantages of the present invention will become apparent from the following

DESCRIPTION OF THE PREFERRED EMBODIMENTS

An embodiment of the present invention will be described below with reference to the drawings.

An overview of the present invention applied to the embodiment will be described first, and then the embodiment will be described in detail.

Figure 1:
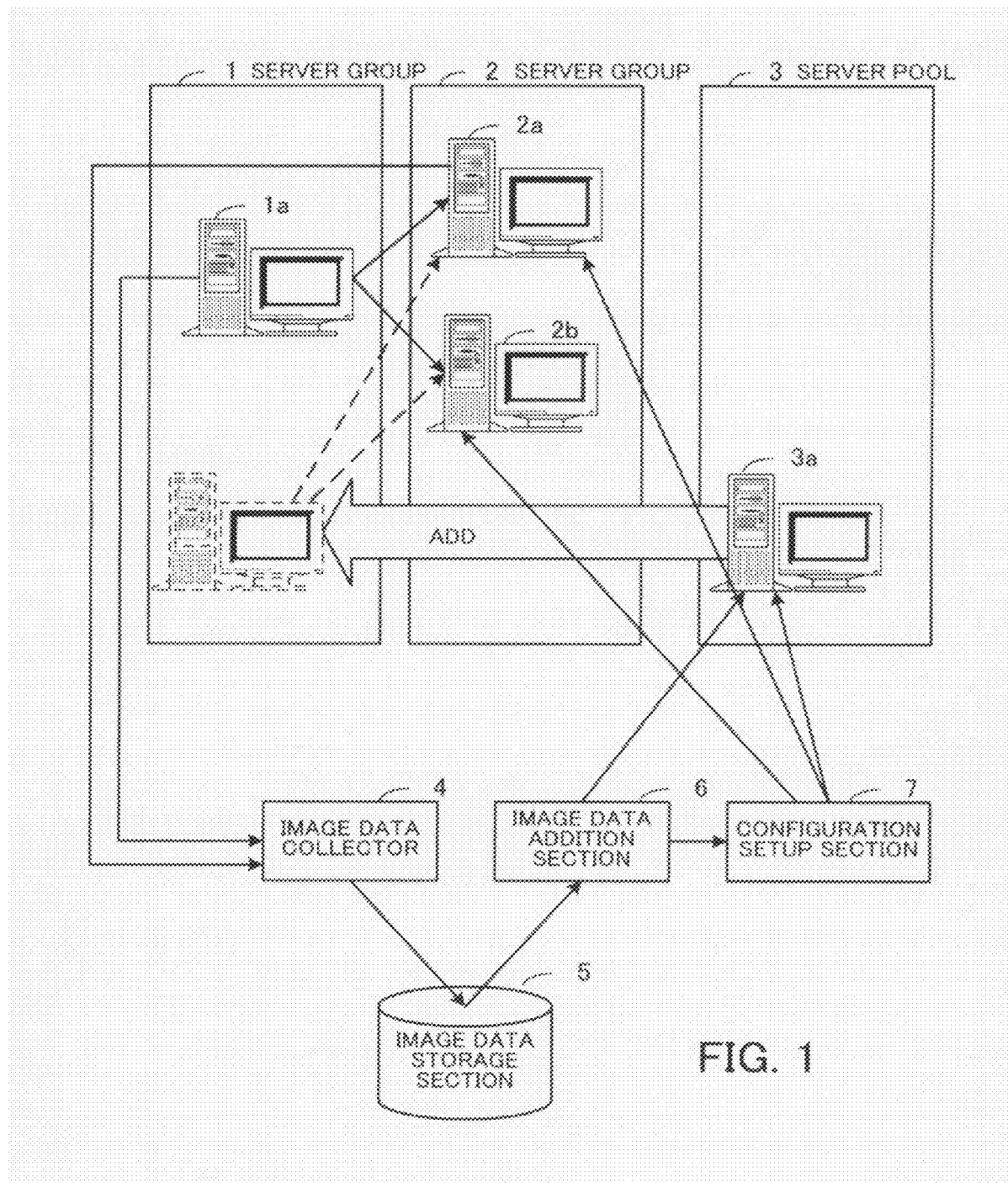
FIG. 1 is a conceptual diagram illustrating the present invention applied to an embodiment.

FIG. 1 is a conceptual diagram illustrating the present invention applied to the embodiment. The present invention is provided to group and manage a plurality of server computers 1a, 2a, and 2b in server groups 1 and 2. A standby server computer 3a is provided in a server pool 3. These computers 1a, 2a, 2b, and 3a are connected through a network and can communicate with one another. As shown in FIG. 1, the present invention includes an image data collector 4, an image data addition section 6, and a configuration setup section 7.

The image data collector 4 collects disk image data from the server computers 1a and 2a included in the server groups 1 and 2 respectively and stores the data in an image data storage section 5. The collected disk image data includes an application program for providing a service and an operating system (OS), for instance. The disk image data can be all data in a hard disk drive or data under a predetermined directory.

When an instruction to add the server computer 3a to the server group 1 or 2 is received, the image data addition section 6 obtains the disk image data collected from the target server group 1 from the image data storage section 5 and stores the data in a memory of the server computer 3a to be added.

The configuration setup section 7 sets up unique information of a mating server computer having a processing request relationship, in the server computer 3a to be added in accordance with processing request relationships among the server computers included in the different server groups. The configuration setup section 7 can also set up unique information of the server computer 3a to be added, in the server computers 2a and 2b which should form a processing request relationship with the server computer 3a to be added. The unique information includes address information (IP (Internet Protocol) address, and the like) of each server computer on the network, for instance.

According to a computer having those functions, an image data collector 4 collects disk image data from the server computers 1a and 2a included in the server groups 1 and 2 respectively and stores the data in an image data storage section 5. When an instruction to add the server computer 3a to the server group 1 or 2 is received, an image data addition section 6 obtains the disk image data collected from the target server group 1 from the image data storage section 5 and stores the data in a memory of the server computer 3a to be added. A configuration setup section 7 sets up unique information of mating server computers having processing request relationships, in the server computer 3a to be added and the server computers 2a and 2b which should form a processing request relationship with the server computer 3a to be added, in accordance with processing request relationships among the server computers included in the different server groups.

This enables a server computer to be added automatically in a system for providing a service by means of a plurality of servers working in cooperation with one another. Accordingly, if the load of a server computer in a server group increases, a server computer can be added quickly to keep appropriate throughput (such as a response time to a client computer) corresponding to the amount of processing.

In addition, because the server computer can be added just by copying the disk image data collected beforehand and setting up the unique information, the addition can be completed in a shorter time than when a whole work of installing an application program on the OS is performed. Accordingly, if a server computer goes out of order, an alternative server computer can be incorporated quickly, improving the reliability of the system.

Among the functions of the present invention, the function of the image data storage section 5 and the other functions can be implemented by different computers. Then, if a firewall is provided between a server computer having the image data collector 4 and the image data addition section 6 and a server computer having the image data storage section 5, the data contained in the managed server computers can be efficiently protected from unauthorized access. Because the disk image data is input to and output from the managed server computers within the network protected by the firewall, the need for taking the disk image data out of the firewall is eliminated, and unauthorized access to the disk image data can be blocked.

The embodiment of the present invention will next be described in detail, using an example in which a disk image data storage function and the other functions are implemented by different computers. In the following description, the disk image data will be referred to simply as image data.

Figure 2:
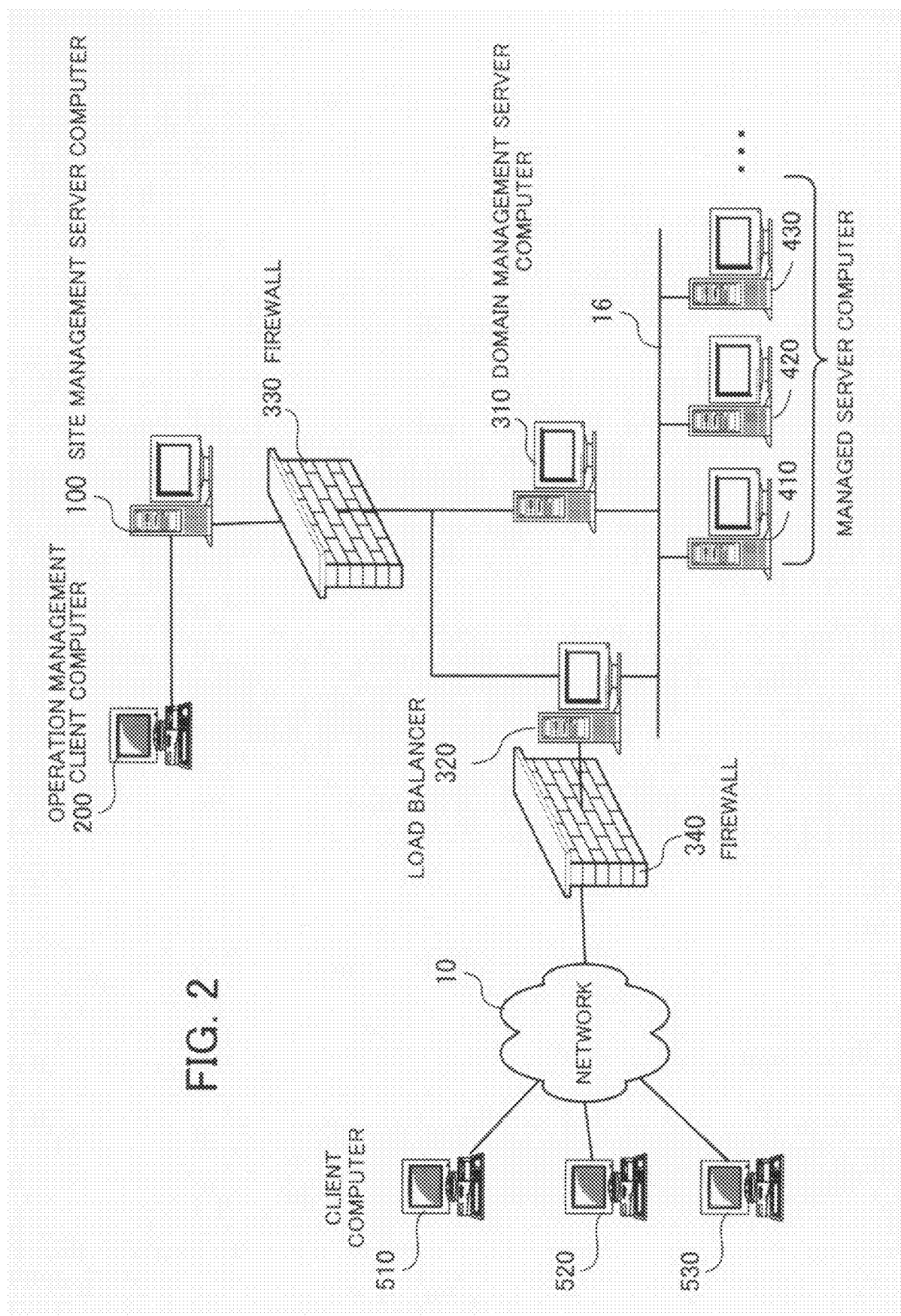
FIG. 2 is a view showing an example system configuration of the embodiment.

FIG. 2 is a view showing an example system configuration of the embodiment. A site management server computer 100 is connected to an operation management client computer 200 and is also connected through a firewall 330 to a domain management server computer 310 and a load balancer 320. The domain management server computer 310 is connected through a LAN (local area network) 16 to a plurality of managed server computers 410, 420, 430, and so on. The LAN 16 is connected to the load balancer 320. The load balancer 320 is connected through a firewall 340 to a network 10. A plurality of client computers 510, 520, 530, and so on are connected to the network 10.

The site management server computer 100 manages the load balancer 320 and the managed server computers 410, 420, 430, and so on. More specifically, the site management server computer 100 groups the managed server computers 410, 420, 430, and so on by services to be provided and manages the computers in those groups. The site management server computer 100 reserves some of the managed server computers 410, 420, 430, and so on as standby server computers (which can be started at any time). The site management server computer 100 adds a reserved managed server computer to any overloaded server group.

The operation management client computer 200 is a terminal apparatus operated by the administrator managing the system. Information on an operation input from the operation management client computer 200 is sent to the site management server computer 100.

The domain management server computer 310 stores the image data of each server group in accordance with an instruction from the site management server computer 100. The domain management server computer 310 stores, in a memory of a managed server computer to be added to a server group, the stored image data of the server group in accordance with an instruction from the site management server computer 100.

The load balancer 320 balances the load of processing requests to the managed server computers 410, 420, 430 and so on.

The firewall 330 suppresses unauthorized access from a network on the side of the site management server computer 100 to the network on the side of the domain management server computer 310 and the load balancer 320.

The firewall 340 suppresses unauthorized access from the network 10 connected to the client computers 510, 520, 530, and so on to the load balancer 320.

The managed server computers 410, 420, 430, and so on are managed in groups and provide services predetermined for the individual server groups to the client computers 510, 520, 530, and so on.

The client computers 510, 520, 530, and so on output a processing request to the managed server computers 410, 420, 430, and so on, in response to an operation input from the user.

In the system described above, system resources are managed by the site management server computer 100, the operation management client computer 200, the domain management server computer 310, and the managed server computers 410, 420, 430, and so on, working in cooperation with one another.

Figure 3:
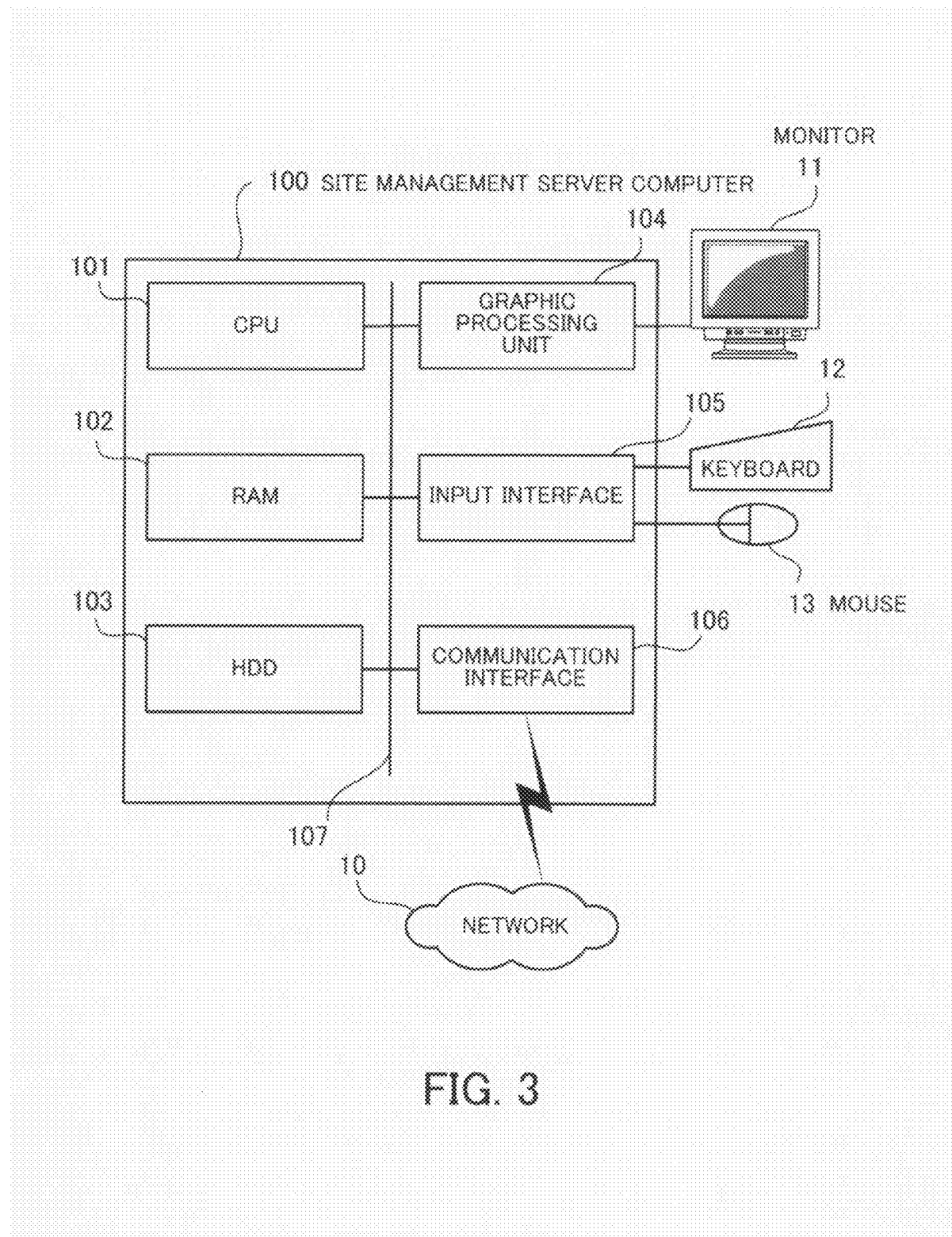
FIG. 3 is a view showing an example hardware configuration of a site management server computer used in the embodiment of the present invention.

FIG. 3 is a view showing an example hardware configuration of the site management server computer used in the embodiment of the present invention. The whole of the site management server computer 100 is controlled by a CPU (central processing unit) 101. The CPU 101 is connected through a bus 107 to a RAM (random access memory) 102, a hard disk drive (HDD) 103, a graphic processing unit 104, an input interface 105, and a communication interface 106.

The RAM 102 temporarily stores at least a part of an application program and the OS (operating system) program to be executed by the CPU 101. The RAM 102 also stores a variety of data needed for the processing by the CPU 101. The HDD 103 stores the OS and the application program.

The graphic processing unit 104 is connected to a monitor 11. The graphic processing unit 104 displays an image on the screen of the monitor 11 in accordance with a command from the CPU 101. The input interface 105 is connected to a keyboard 12 and a mouse 13. The input interface 105 sends a signal sent from the keyboard 12 or the mouse 13 to the CPU 101 through the bus 107.

The communication interface 106 is connected to the network 10. The communication interface 106 exchanges data with another computer through the network 10.

With this hardware configuration, the processing functions of the embodiment can be implemented. FIG. 3 shows an example hardware configuration of the site management server computer 100. The other apparatuses can be implemented with similar hardware.

Resource management processing functions provided by each computer will next be described. The site management server computer 100 manages the managed server computers in a plurality of server groups in accordance with the processing functions. The server group is a set of server computers that have the same service settings, provide the same service (duty), and are managed as a single group, among the server computers to be managed by the site management server computer 100.

Figure 4:
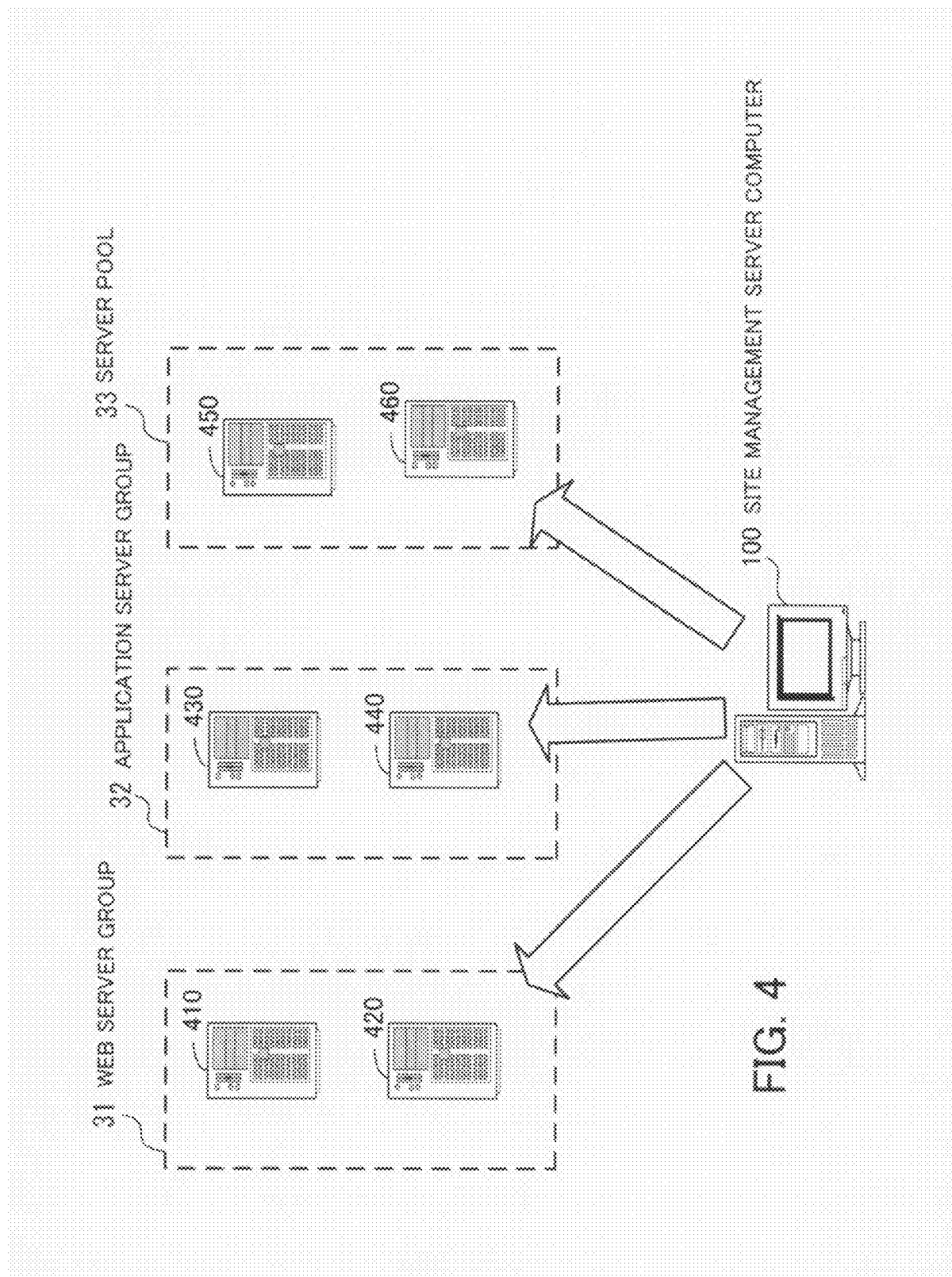
FIG. 4 is a view showing example server groups.

FIG. 4 is a view showing an example server groups. In the example shown in FIG. 4, managed server computers 410, 420, 430, 440, 450, and 460 are divided into two server groups and one server pool.

A web server group 31 includes the managed server computers 410 and 420 incorporating a server application for web server use. An application server group 32 includes the managed server computers 430 and 440 incorporating a server application for application server use. A server pool 33 includes the managed server computers 450 and 460 provided on standby.

The site management server computer 100 has functions to perform remote control and integrated management of the server groups. More specifically, the site management server computer 100 manages processing request relationships (logical connections) among the managed server computers when a multilayer application provides a service to the client computers 510, 520, 530, and so on. The request relationships can be classified into mesh load balancing type (mesh connection) and line load balancing type (line connection) by connection pattern.

Figure 5:
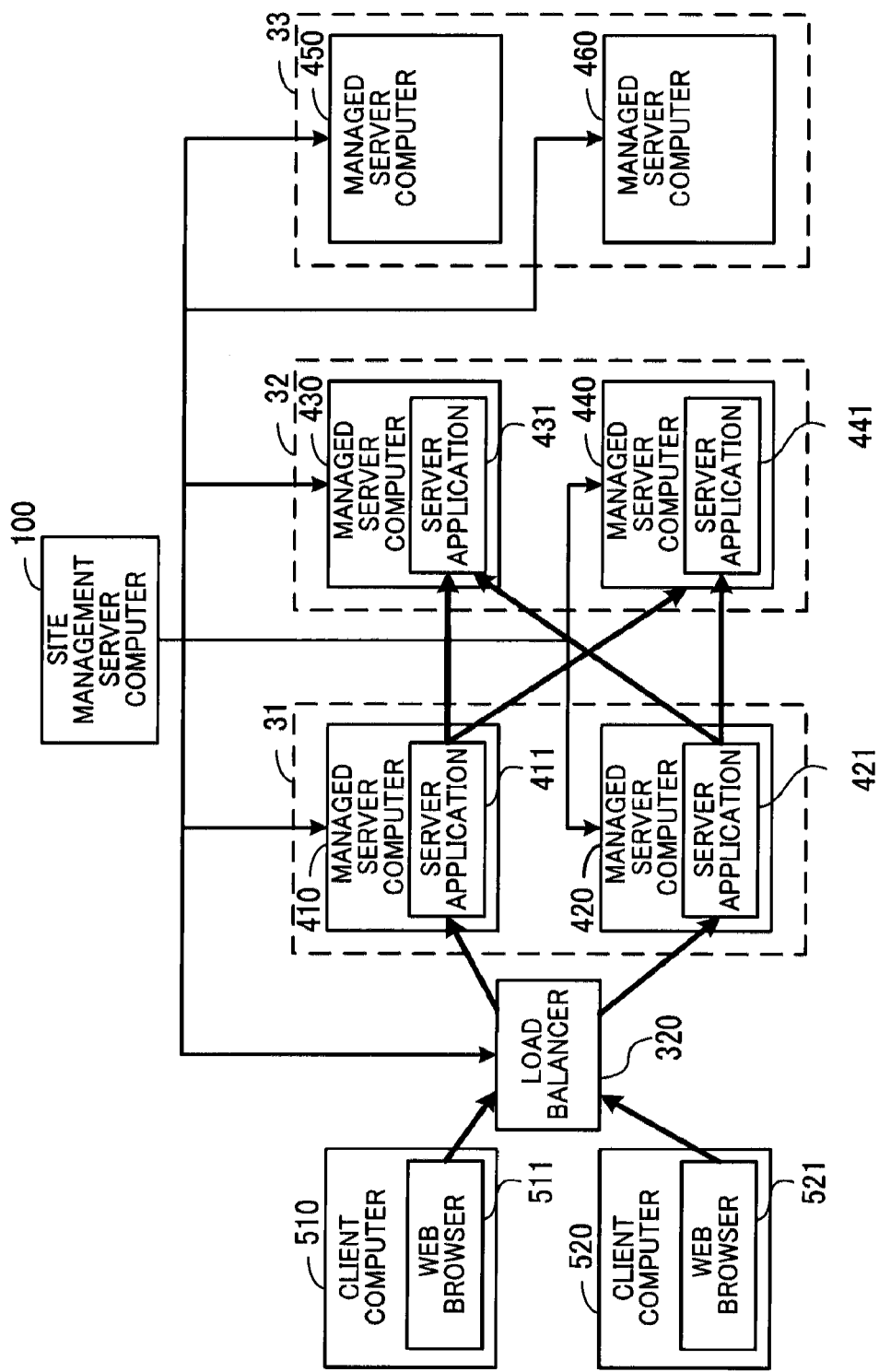
FIG. 5 is a view showing an example of mesh connection.

FIG. 5 is a view showing an example of mesh connection. In the example, the managed server computers 410 and 420 have server applications 411 and 421 for web server use. The managed server computers 430 and 440 have server applications 431 and 441 for application server use.

The timing of arrangement of the server applications incorporated in the managed server computers 410, 420, 430, and 440 is controlled by the site management server computer 100. The site management server computer 100 also manages detailed settings related to the balancing processing in the load balancer 320.

In the mesh connection, each of the server applications 411 and 421 in the web server group 31 is connected to the server applications 431 and 441 in the application server group 32.

The client computers 510 and 520 have web browsers 511 and 521 respectively. The user inputs a variety of commands to the web browsers 511 and 521 by operations input on the client computers 510 and 520. If the command given by an operation input contains a request for servicing through the network 10, the web browser 511 or 521 outputs a processing request corresponding to the command.

The load balancer 320 assigns the processing request output from the web browser 511 or 521 to either of the server applications 411 and 421 for web server use. When the processing request is received, the server application 411 or 421 for web server use gives a processing request to either the server application 431 or the server application 441. The server application 431 or 441 executes the requested processing.

Figure 6:
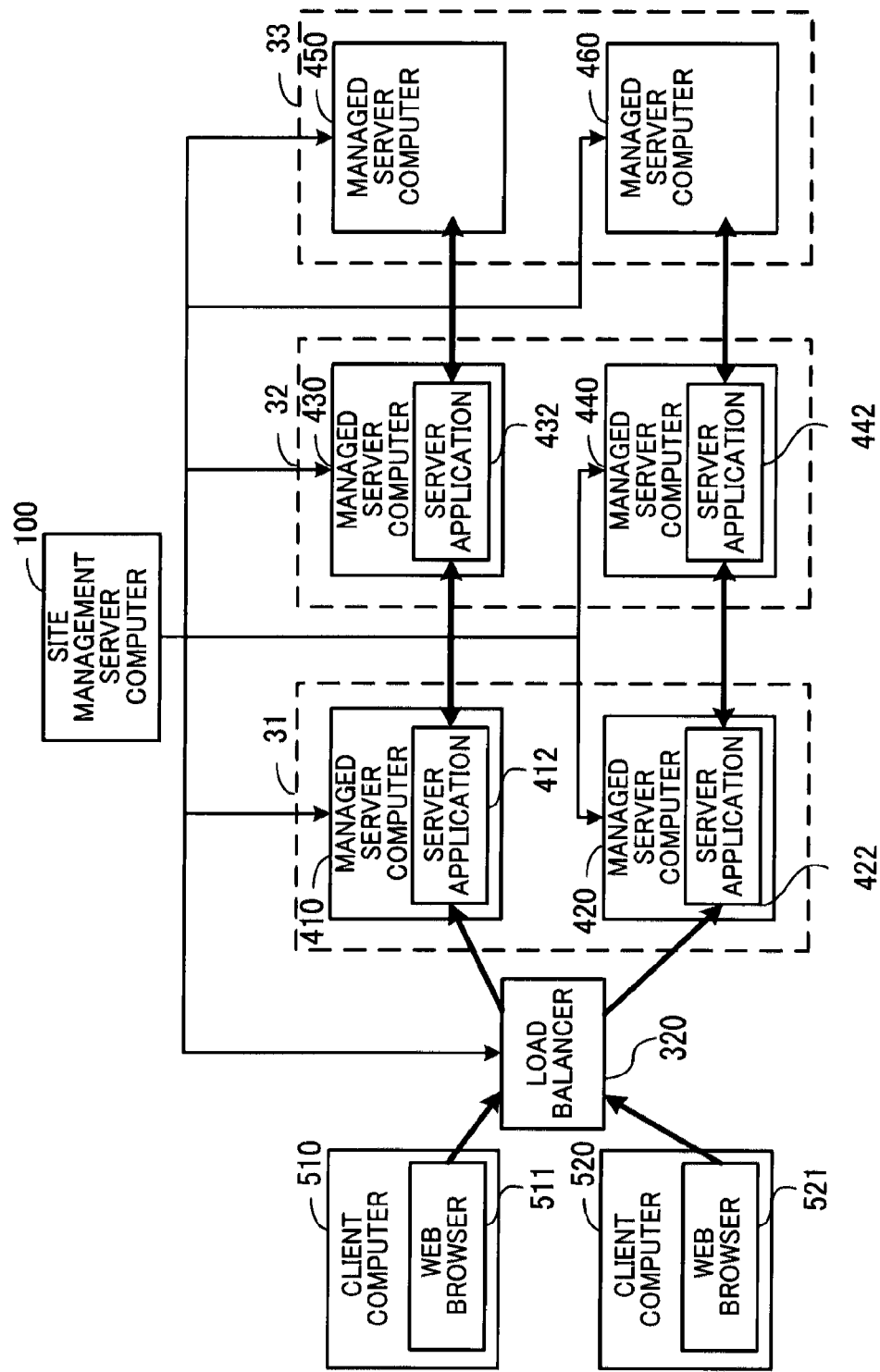
FIG. 6 is a view showing an example of line connection.

FIG. 6 is a view showing an example of line connection. The line connection associates one server in each server group with each other. In the example shown in FIG. 6, a server application 412 for web server use is associated with a server application 432 for application server use. A server application 422 for web server use is associated with a server application 442 for application server use. These associated servers provide multilayer services.

When a managed server computer in the server pool 33 is added to a certain server group, a computer or computers to be connected depend on whether the mesh connection or the line connection is made. In addition, when the managed server computer is added to the server group, identification information of the connected computer(s) should be specified in the managed server computer, and identification information of the added server computer should be specified in the connected server computer(s).

The addition and deletion of the managed server computer to or from the server group will next be described in detail.

Figure 7:
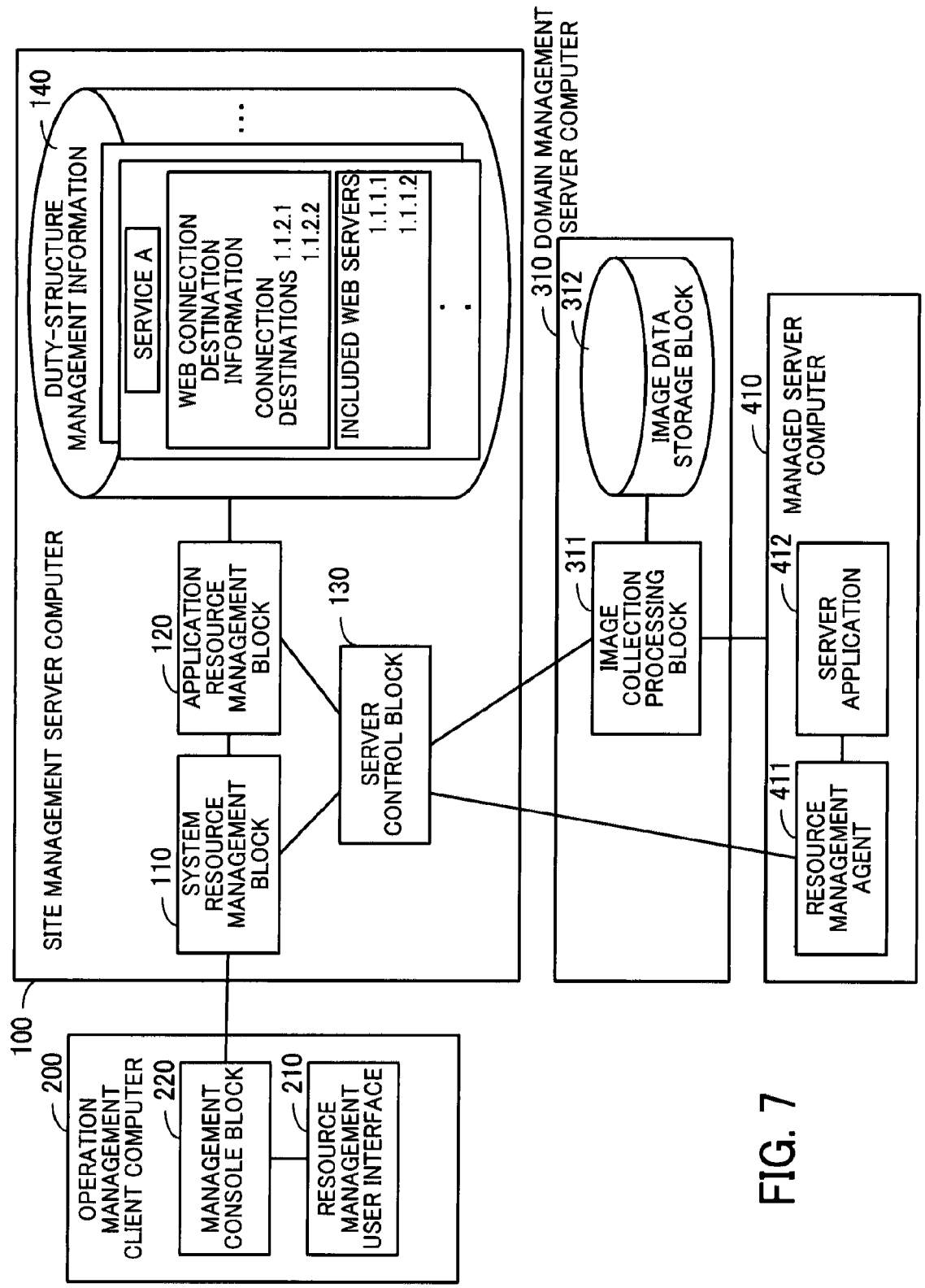
FIG. 7 is a block diagram showing functions of computers.

FIG. 7 is a block diagram showing functions of computers. FIG. 7 includes functional blocks of the managed server computer 410. The other managed server computers 420, 430, 440, 450, and 460 have the same functions.

The site management server computer 100 includes a system resource management block 110, an application resource management block 120, a server control block 130, and duty-structure management information 140. The system resource management block 110 manages the OS and other basic resources of the managed server computers 410, 420, 430, 440, 450, and 460 in accordance with instructions from the operation management client computer 200.

The application resource management block 120 manages resources related to server applications providing a service in the managed server computers 410, 420, 430, 440, 450, and 460.

The server control block 130 controls the domain management server computer 310 and the managed server computers 410, 420, 430, 440, 450, and 460 in accordance with instructions from the system resource management block 110 and the application resource management block 120.

The duty-structure management information 140 includes, for each server group, information related to services provided to the client computers 510, 520, 530, and so on in the entire system. More specifically, the duty-structure management information 140 includes the service name (such as "service A") of a service provided by a server group, the IP addresses (such as "connection destinations: 1.1.2.1, 1.1.2.2") of the managed server computers at the connection destinations, the IP addresses (such as "included web servers: 1.1.1.1, 1.1.1.2") of managed server computers included in the server group, and the like.

In this system, a plurality of services are managed by their service names (such as "service A"). The client computers 510, 520, and 530 specify the target of a processing request by the service name. If a multilayer service is provided (such as a web server and an application), a plurality of server groups are associated with an identical service name.

For a service to be provided by a web server and an application working in cooperation with each other, the IP address of a managed server computer providing the function of an application server is specified as the connection destination information from the web server, in the duty-structure management information 140. The IP address of a managed server computer providing the function of a web server is specified as the connection source information of the application server, in the duty-structure management information 140.

The operation management client computer 200 includes a resource management user interface 210 and a management console block 220. The resource management user interface 210 receives an operation input from the administrator for resource management and displays the result of processing. The management console block 220 functions as a console terminal for resource management in the site management server computer 100. The management console block 220 sends information on an operation input from the administrator to the site management server computer 100 and receives a response from the site management server computer 100.

The domain management server computer 310 includes an image collection processing block 311 and an image data storage block 312. The image collection processing block 311 collects image data of a hard disk drive from the managed server computer 410 and stores the data in the image data storage block 312 in accordance with an instruction from the site management server computer 100. The image collection processing block 311 obtains image data from the image data storage block 312 and transfers the data to a managed server computer to be added to the server group in accordance with an instruction from the site management server computer 100.

The managed server computer 410 includes a resource management agent 411 and a server application 412. The resource management agent 411 manages the resources of the managed server computer 410 in accordance with an instruction from the site management server computer 100. The server application 412 executes processing in accordance with a processing request sent from a client computer.

The processing executed in this embodiment will next be described. First, server group creation processing will be described.

Figure 8:
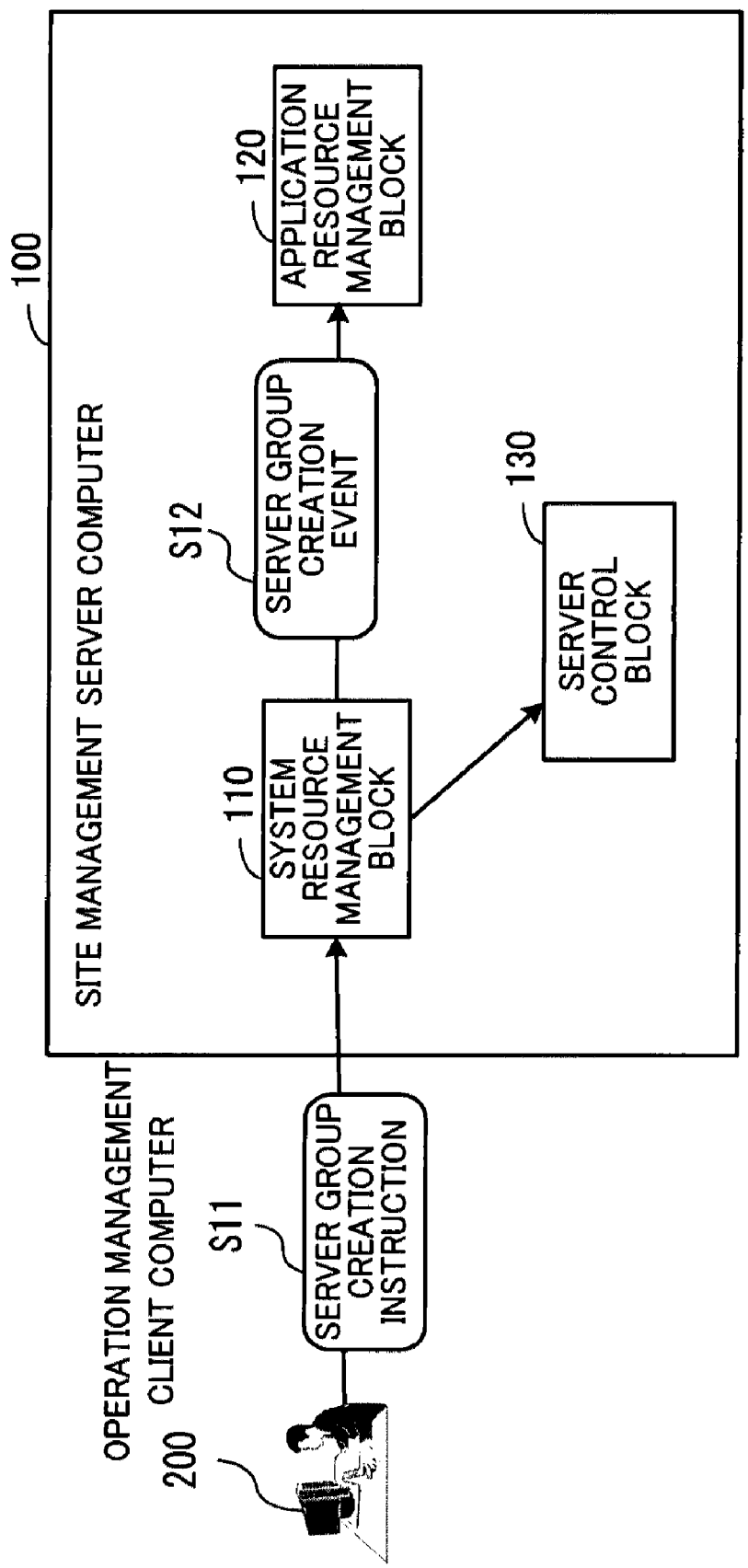
FIG. 8 is a view showing server group creation processing.

FIG. 8 is a view showing the server group creation processing. The administrator operates the operation management client computer 200 to input a server group creation command. Then, the operation management client computer 200 outputs an instruction to create a server group to the site management server computer 100 (in step S11). The server group creation instruction contains information on a service provided in the server group to be created, the designation of managed server computers to be included in the server group, and the like.

The server group creation instruction is received by the system resource management block 110 in the site management server computer 100. The system resource management block 110 holds information on the specified server group and gives the information on the newly created server group to the server control block 130.

The system resource management block 110 outputs a server group creation event to the application resource management block 120 (in step S12). With the server group creation event, the application resource management block 120 recognizes the structure of the newly created server group.

The web server group 31 and the application server group 32 are created in the system in this way. Then, a common server application (for web server use or application server use) is installed on the managed server computers included in the same server group. The disk image data of the storage device containing the server application is collected from each server group.

Figure 9:
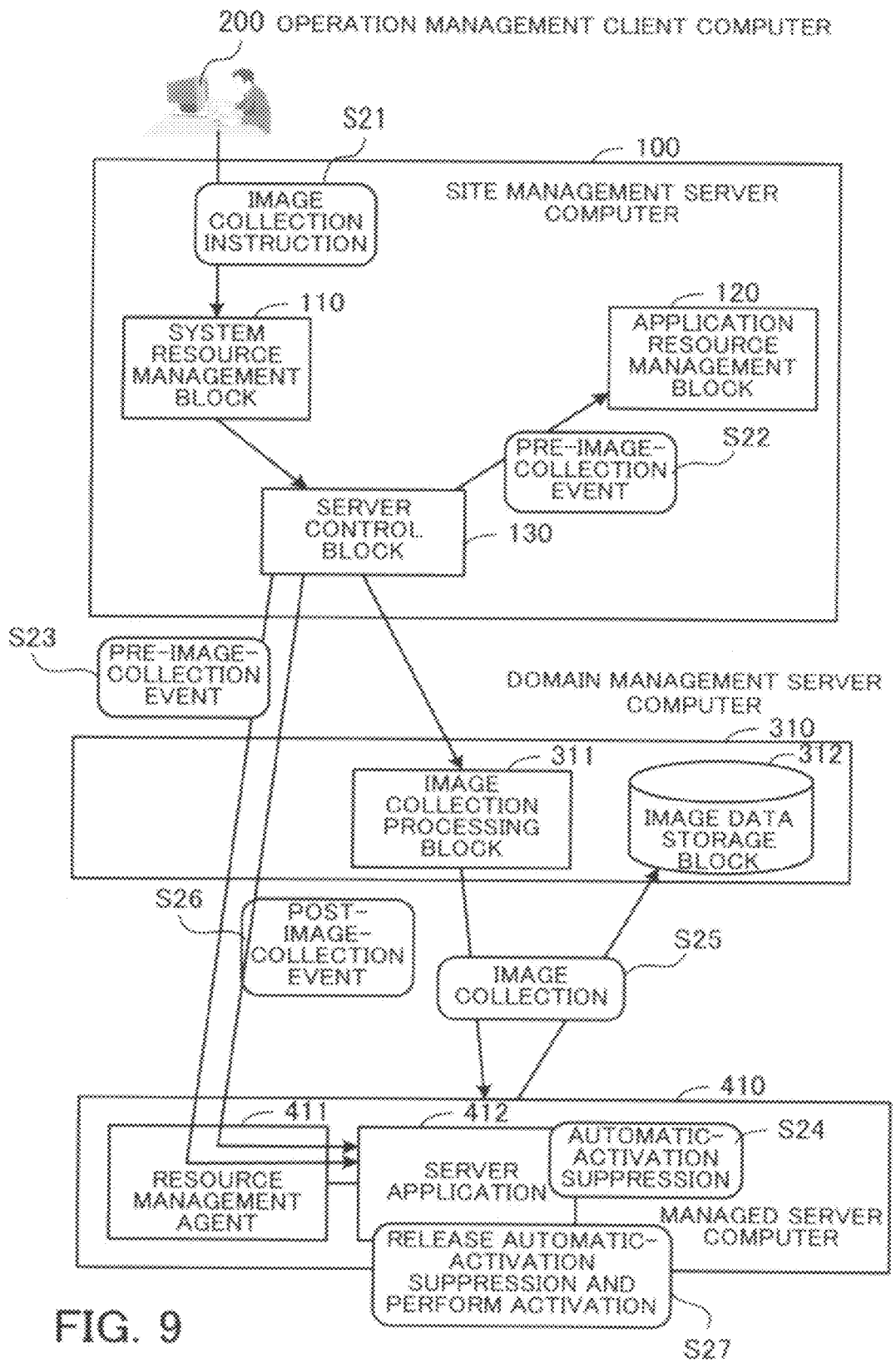
FIG. 9 is a view showing image data collection processing.

FIG. 9 is a view showing image data collection processing. When image data is collected, the managed server computer 410 is set to a maintenance mode (servicing is stopped) in advance.

The administrator operates the operation management client computer 200 to input an instruction to collect an image. Then, the operation management client computer 200 outputs the image collection instruction to the site management server computer 100 (in step S21).

In the site management server computer 100, the system resource management block 110 receives the image collection instruction. The system resource management block 110 sends the image collection instruction to the server control block 130. The server control block 130 outputs a pre-image-collection event to the application resource management block 120. The application resource management block 120 stores information that includes the image collection time. This information is used in a latest-version check when the image data is installed.

The latest-version check can be made by using the storage time of the image data held in the domain management server computer 310. In that case, the need for issuing the pre-image-collection event, indicated in step S22, is eliminated.

The server control block 130 sends (in step S23) the pre-image-collection event to the managed server computer 410, from which the image data is collected.

The pre-image-collection event is received by the resource management agent 411 of the managed server computer 410. When the pre-image-collection event is issued, the resource management agent 411 suppresses the automatic activation of the server application 412 (in step S24). In other words, the resource management agent 411 sets up such a configuration that an activation request to the server application 412 will not be executed.

The server control block 130 gives the domain management server computer 310 the image data collection instruction, and the image collection processing block 311 performs processing to collect the disk image from the managed server computer 410 (in step S25). The collected image data is stored in the image data storage block 312.

More specifically, the resource management agent 411 shuts down the OS of the managed server computer 410 by remote control from the server control block 130. In the managed server computer 410, a function to perform minimum operation to receive remote control from the server control block 130 remains active after the main OS is shut down. This function can be implemented, for instance, by activating another OS differing from the target OS of image collection.

The image collection processing block 311 in the domain management server computer 310 stores the data in the hard disk drive of the managed server computer 410 in the image data storage block 312. After the storage is completed, the server control block 130 performs remote control to reactivate the main OS of the managed server computer 410. At that time, the server application 412 is not activated because the activation is suppressed.

After the image data collection ends, the server control block 130 outputs a post-image-collection event to the resource management agent 411 (in step S26). The post-image-collection event is received by the resource management agent 411. In response to the post-image-collection event, the resource management agent 411 releases the automatic-activation suppression for the server application 412 and performs activation processing (in step S27).

Now, image data representing a disk image of the managed server computer 410 is created on the domain management server computer 310. Then, the administrator can add any cloning resource to the server application 412 of the managed server computer 410. The added cloning resource must be added also to the image data in the domain management server computer 310.

Figure 10:
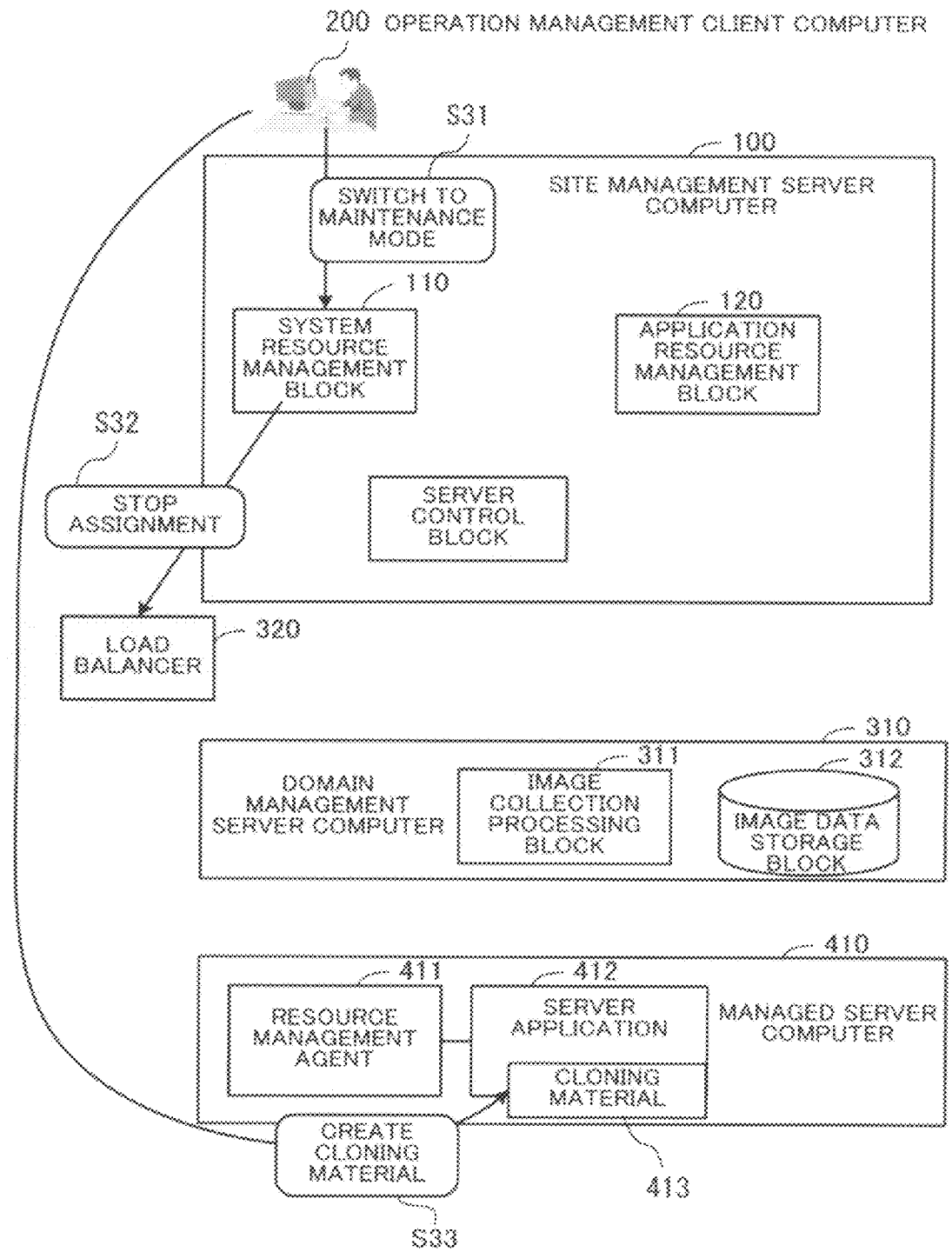
FIG. 10 is a view showing a first half of cloning material collection processing.

FIG. 10 is a view showing a first half of cloning material collection processing. As shown in FIG. 10, the administrator uses the operation management client computer 200 to output an instruction to switch to the maintenance mode to the site management server computer 100 (in step S31). The system resource management block 110 of the site management server computer 100 outputs an instruction to stop assignment to the managed server computer 410 to be the target of cloning resource creation, to the load balancer 320 (in step S32). In response to the assignment stop instruction, the load balancer 320 stops the assignment of a processing request to the managed server computer 410.

Then, the administrator uses the operation management client computer 200 to perform processing to create a cloning material 413 in the managed server computer 410 (in step S33). With this, the cloning material 413 is stored in the managed server computer 410.

Figure 11:
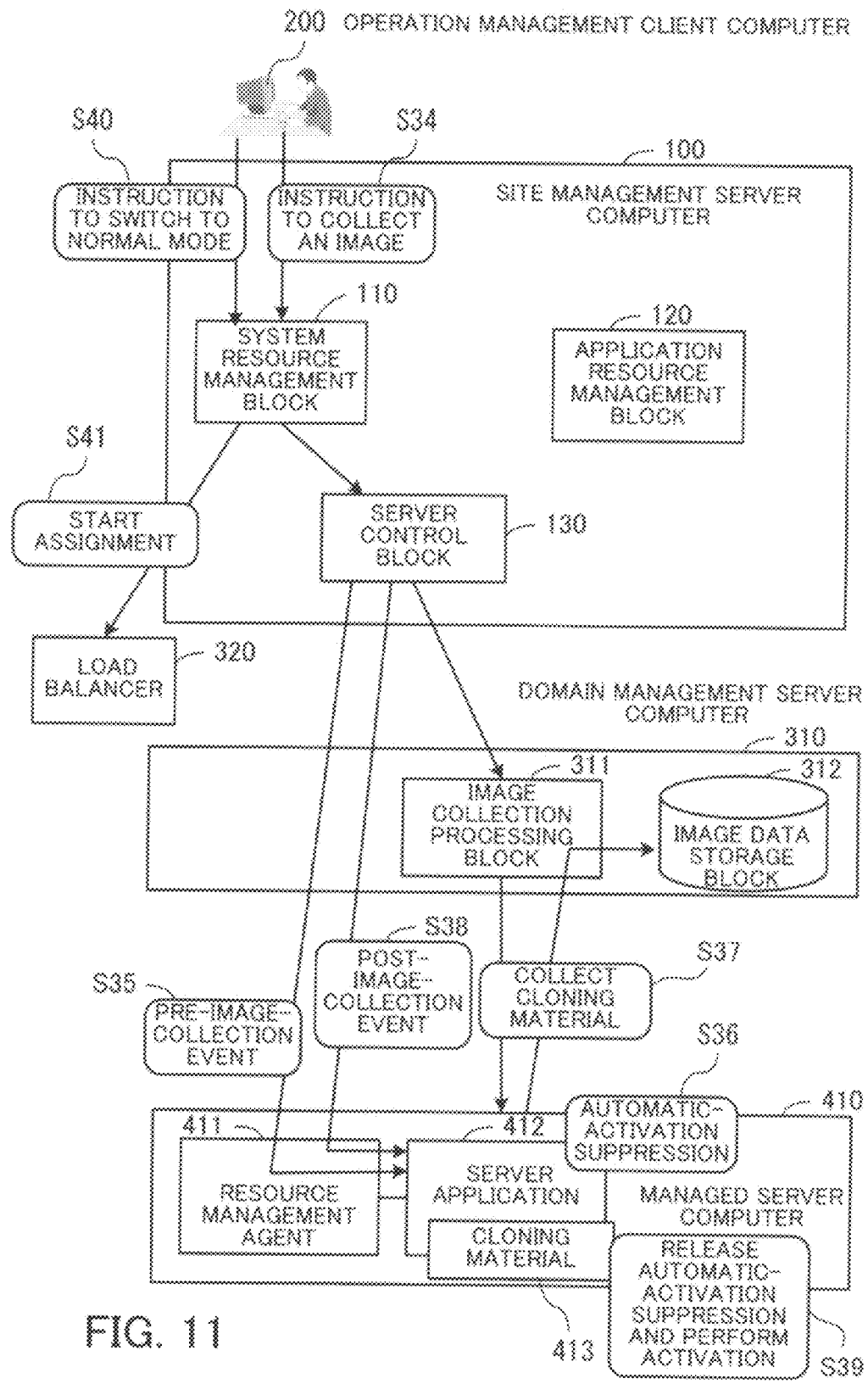
FIG. 11 is a view showing a second half of the cloning material collection processing.

FIG. 11 is a view showing a second half of the cloning material collection processing. The operation management client computer 200 outputs an instruction to collect an image (in step S34); a pre-image-collection event is issued (in step S35); and automatic-activation suppression processing is performed (in step S36). These processes are the same as the process to give the image collection instruction (in step S21), the process to issue the pre-image-collection event (in step S23), and the automatic-activation suppression process (in step S24) in the image data collection processing, shown in FIG. 9.

Next, the server control block 130 outputs an instruction to collect the cloning material to the image collection processing block 311, and the image collection processing block 311 performs processing to collect the cloning material 413 (in step S37). Then, the cloning material 413 is stored in the image data storage block 312.

After the cloning material 413 is collected, a post-image-collection event is issued (in step S38). The automatic-activation suppression is released, and the activation processing is performed (in step S39). These processes are the same as the process to issue the post-image-collection event (in step S25) and the process to release the automatic-activation suppression and to perform activation (in step S27), in the image data collection processing, shown in FIG. 9.

Then, the administrator inputs a command to switch to the normal mode to the operation management client computer 200. This causes the operation management client computer 200 to input an instruction to switch to the normal mode to the site management server computer 100 (in step S40). In the site management server computer 100, the system resource management block 110 receives the instruction to switch to the normal mode and outputs an instruction to start assignment to the managed server computer 410, to the load balancer 320 (in step S41). Then, the load balancer 320 starts the assignment of a subsequent processing request to the managed server computer 410.

The managed server computers included in an identical server group must hold the same processing to be performed by the server applications. If the server applications must be updated, update processing is applied to the managed server computers included in the server group simultaneously.

Figure 12:
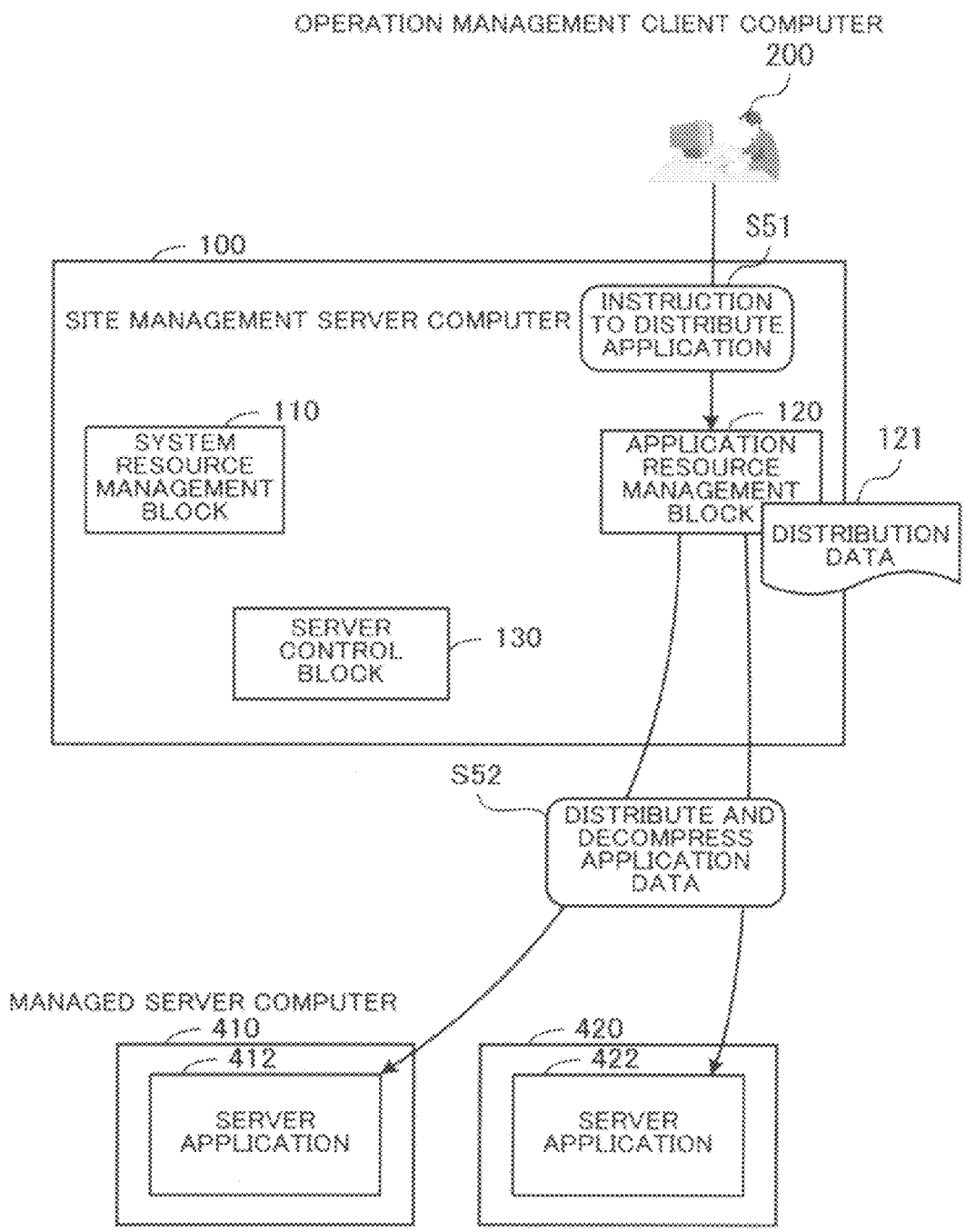
FIG. 12 is a view showing application update processing.

FIG. 12 is a view showing the application update processing. In the example shown in FIG. 12, it is assumed that a web server application is updated.

The administrator operates the operation management client computer 200 to input a command to distribute a server application. The operation management client computer 200 outputs an instruction to distribute the application, to the site management server computer 100 (in step S51). The application distribution instruction is received by the application resource management block 120 of the site management server computer 100.

In response to the application distribution instruction, the application resource management block 120 distributes data 121 provided beforehand to the managed server computers 410 and 420 and decompresses the data (in step S52). More specifically, the application resource management block 120 transfers the distribution data 121 to both the managed server computer 410 and the managed server computer 420. The application resource management block 120 performs remote control of the managed server computers 410 and 420 to decompress the transferred distribution data and set up an operating environment after the decompression.

In this way, the individual server computers included in each server group have the same operating environment for the server application. When a new server computer is added to a server group, the same operating environment as set up for the existing server computers in the server group must be built for the new server computer.

Figure 13:
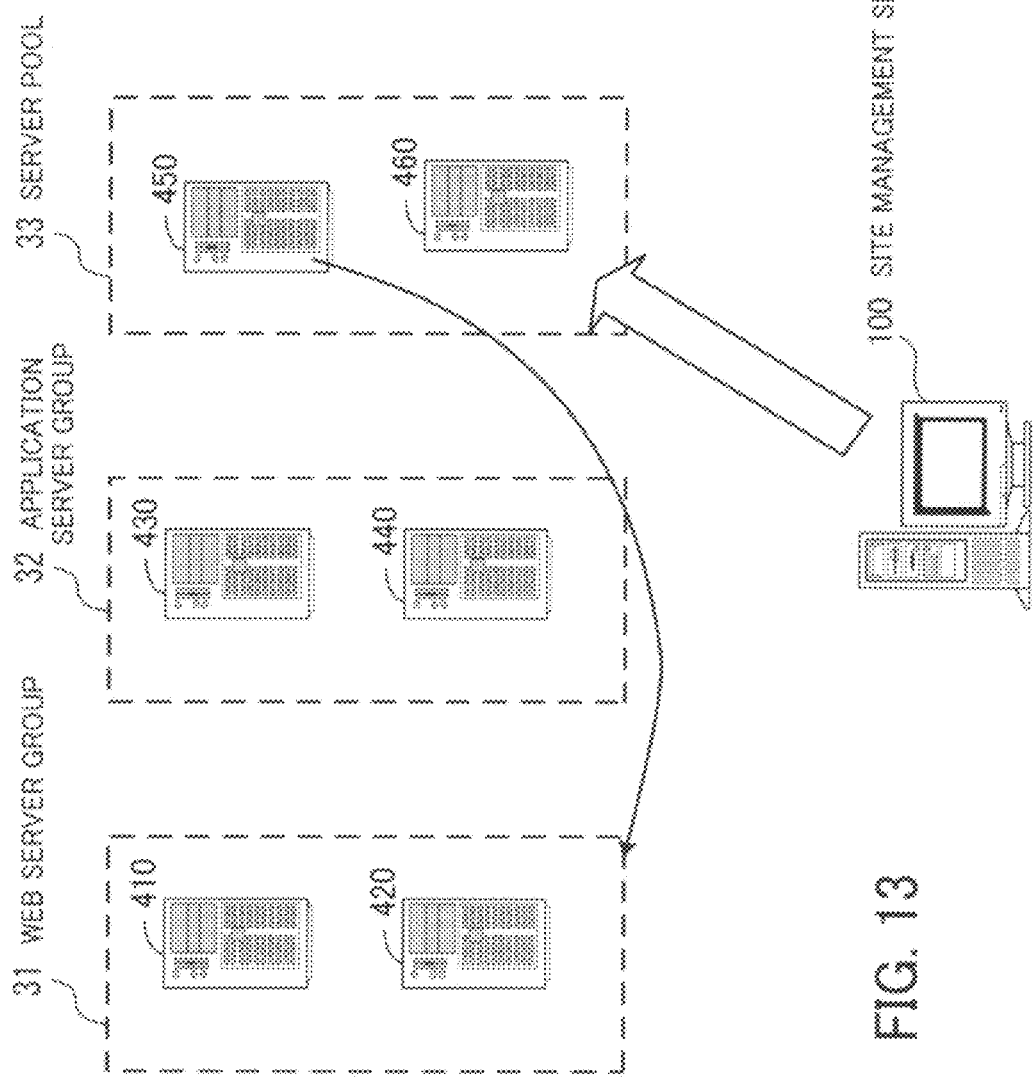
FIG. 13 is a view showing a status of adding a managed server computer to a server group.

FIG. 13 is a view showing a status of adding a managed server computer to a server group. In the example shown in FIG. 13, the managed server computer 450 in the server pool 33 is added to the web server group 31 under the control of the site management server computer 100. In this case, a program and data required to operate the managed server computer 450 as a web server are installed on the managed server computer 450. Server addition processing will be described below in detail.

Figure 14:
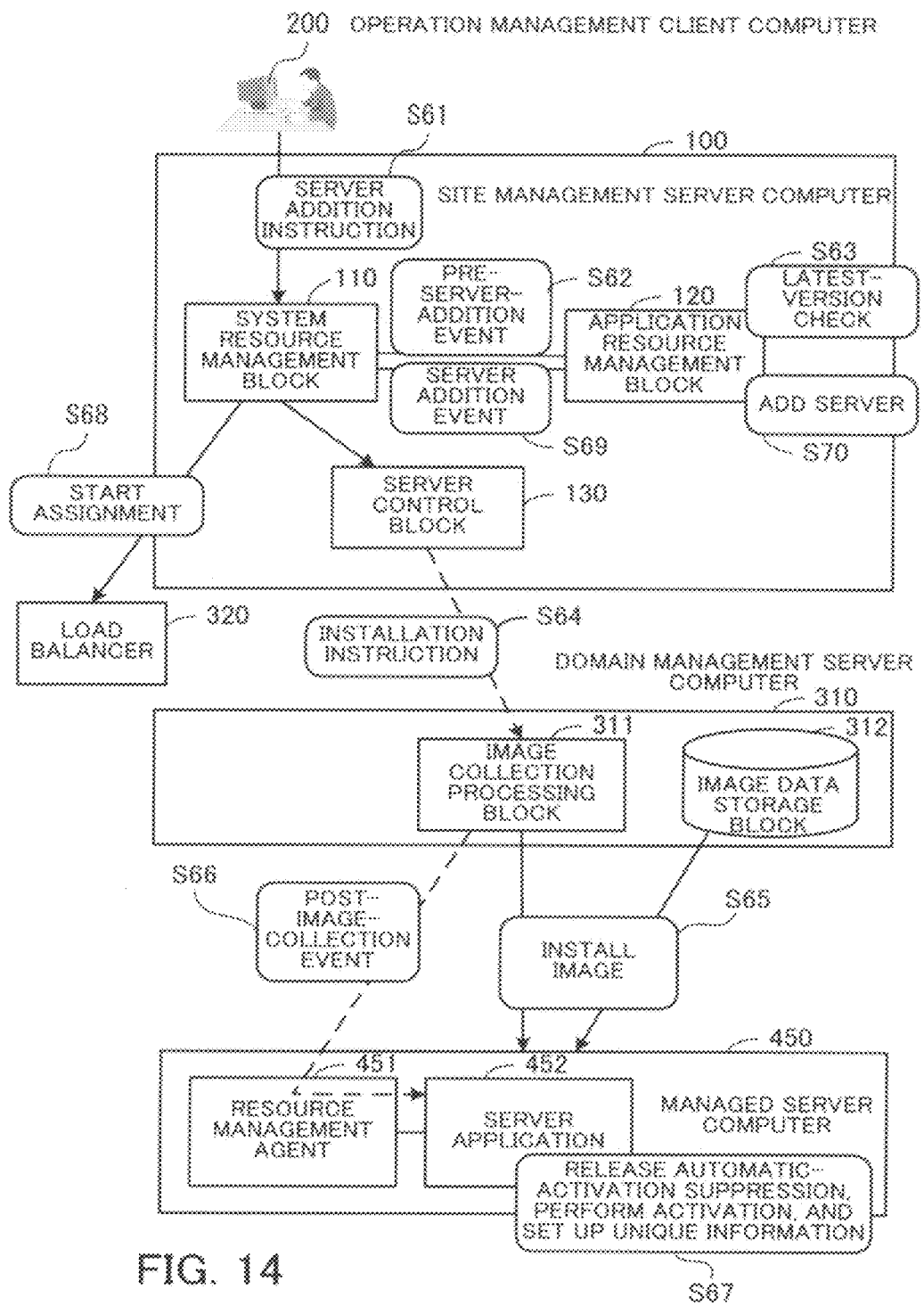
FIG. 14 is a view showing server addition processing.

FIG. 14 is a view showing the server addition processing. When a server computer is added, the administrator operates the operation management client computer 200 to input a command to add the server computer. The operation management client computer 200 outputs an instruction to add the server computer, to the site management server computer 100 (in step S61).

The addition instruction is received by the system resource management block 110 of the site management server computer 100. The system resource management block 110 outputs a pre-server-addition event related to the server group to the application resource management block 120 (in step S62).

In response to the pre-server-addition event, the application resource management block 120 checks whether the collected image data is the latest version (in step S63). The latest version of the image data can be checked, for instance, by obtaining the date and time of collection of the image data and judging whether the application resource has been updated after the date and time.

If the latest-version check processing indicates that the latest image data is not held, the application resource management block 120 returns an error to the system resource management block 110. Then, the system resource management block 110 sends an error message to the operation management client computer 200. Then, the server addition operation is terminated.

If the latest-version check processing indicates that the latest image data is held, the fact is passed from the application resource management block 120 to the system resource management block 110. Then, the system resource management block 110 outputs an installation instruction to the managed server computer 450 to be added and the domain management server computer 310, through the server control block 130 (in step S64).

In the domain management server computer 310, the image collection processing block 311 receives the installation instruction. The image collection processing block 311 executes processing to install the image data (in step S65). More specifically, the image data is installed in the following procedure.

First, the system resource management block 110 shuts down the OS of the target managed server computer 450 by remote control. Then, the image collection processing block 311 installs the image data stored in the image data storage block 312 into a hard disk drive of the managed server computer 450. Next, the system resource management block 110 reactivates the managed server computer 450.

When the image data is collected, the processing to suppress the activation of a server application 452 is performed prior to the collection processing. A copy is created from the image data in which the activation of the server application is suppressed. The activation of the server application 452 is kept suppressed after the image data is installed on the managed server computer 450, and the server application 452 is not activated.

The system resource management block 110 outputs a post-image-collection event through the image collection processing block 311 (in step S66). The post-image-collection event is received by a resource management agent 451 of the managed server computer 450. The resource management agent 451 releases the suppression of activation of the server application 452. Moreover, the resource management agent 451 decompresses the cloning material and rewrites the unique information (IP address and the like) of the managed server computer 450 (in step S67).

Then, the system resource management block 110 outputs an instruction to start assignment to the added managed server computer 450, to the load balancer 320 (in step S68). The system resource management block 110 also outputs a server addition event to the application resource management block 120 (in step S69). In response to the server addition event, the application resource management block 120 adds information related to the newly added managed server computer 450 to the information of the server group managed by itself (in step S70).

The managed server can be added to the server group as described above. If the processing load on the server group is reduced to a predetermined value or therebelow, any managed server computer can be deleted from the server group and returned to the server pool 33.

Figure 15:
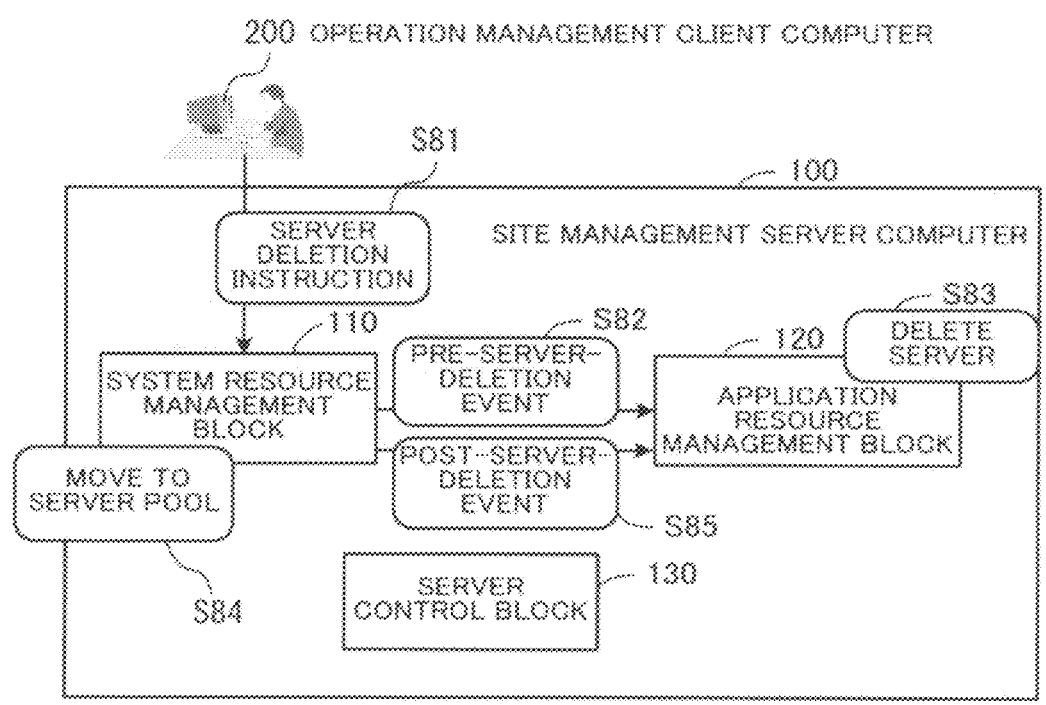
FIG. 15 is a view showing processing to delete a managed server computer from a server group.

FIG. 15 is a view showing processing to delete a managed server computer from a server group. The administrator inputs a command to delete a managed server computer from a server group, to the operation management client computer 200. Then, the operation management client computer 200 outputs a server deletion instruction to the site management server computer 100 (in step S81). The system resource management block 110 of the site management server computer 100 receives the server deletion instruction. In response to the server deletion instruction, the system resource management block 110 outputs a pre-server-deletion event to the application resource management block 120 (in step S82).

In response to the pre-server-deletion event, the application resource management block 120 deletes the information on the specified managed server computer from the list of the managed server computers in the server group (in step S83).

The system resource management block 110 changes the group including the specified managed server computer to the server pool (in step S84). Then, the system resource management block 110 outputs a post-server-deletion event to the application resource management block 120 (in step S85). Now, the application resource management block 120 recognizes the completion of the processing to delete the managed server computer from the server group.

When a managed server computer is added to a server group, the data for providing a predetermined service can be automatically incorporated into the managed server computer, as described above. In the environment build for the managed server computer, unique information that includes the IP address is specified. Unique information setup processing will be described below in detail.

Although the unique information setup processing is performed by the resource management agent 451 as instructed by the application resource management block 120, the resource management agent 451 operates just as an auxiliary function of the application resource management block 120. Therefore, in the following description of the setup procedure, it is assumed that the application resource management block 120 sets up the unique information.

Figure 16:
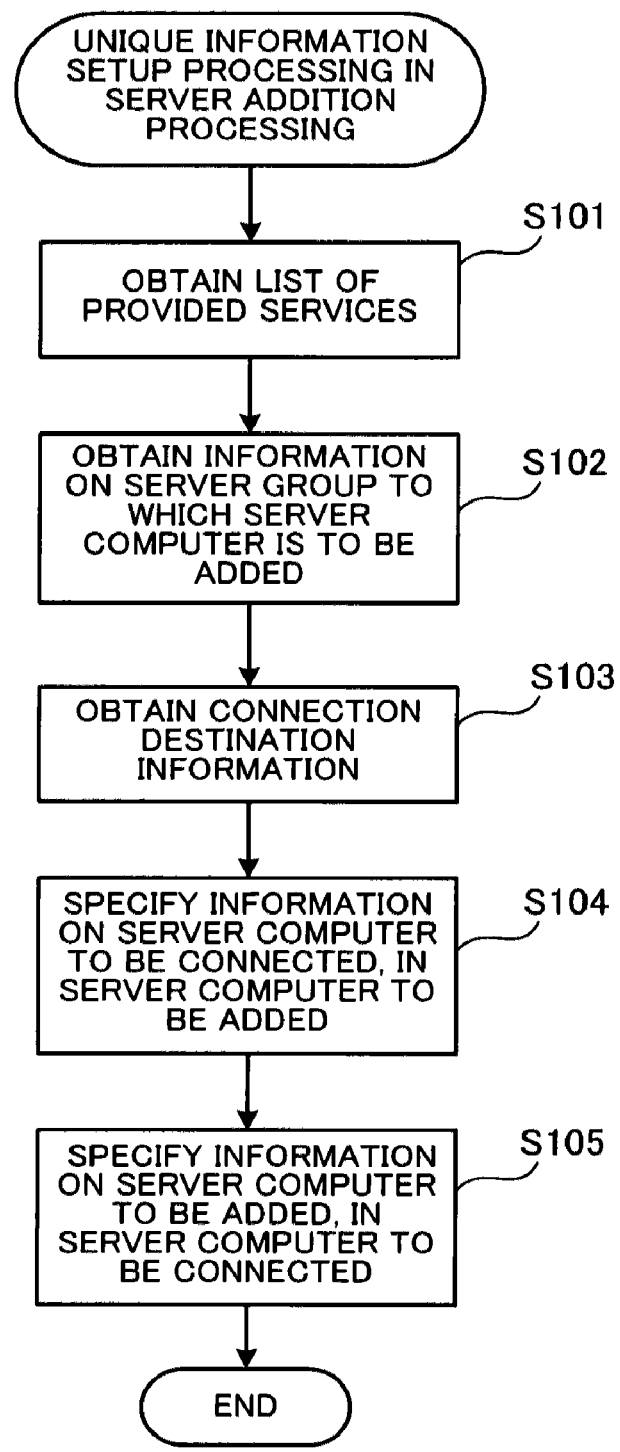
FIG. 16 is a flow chart showing a procedure of unique information setup processing in the server addition processing.

FIG. 16 is a flow chart showing a procedure of unique information setup processing in the server addition processing. The procedure shown in FIG. 16 will be described in order of step number.

Step S101: The application resource management block 120 obtains a list of services provided by the system, from the duty-structure management information 140.

Step S102: The application resource management block 120 obtains information on a service provided in the server group to which a managed server computer should be added, from the duty-structure management information 140.

Step S103: The application resource management block 120 obtains information on managed server computers to which the managed server computers included in the target server group are connected (connection destination information), from the duty-structure management information 140. A connection destination of a managed server computer is a managed server computer to which a request of processing to provide a service is output. If an application server function is required when a web server provides a service, a managed server computer that provides the application server function will be the connection destination, for instance.

Step S104: The application resource management block 120 sets up the information (IP address and the like) of the connection destination, in the managed server computer to be added. If a web server is added, the IP address of an application server is added to the managed server computer to be added.

Step S105: The application resource management block 120 sets up the information (IP address and the like) of the managed server computer to be added, in the managed server computer at the connection destination.

Described below are examples of setting up unique information when a server computer is added to the web server group 31 and when a server computer is added to the application server group 32. In the following examples, it is assumed that each managed server computer included in the web server group 31 can make a processing request to all managed server computers included in the application server group 32.

Figure 17:
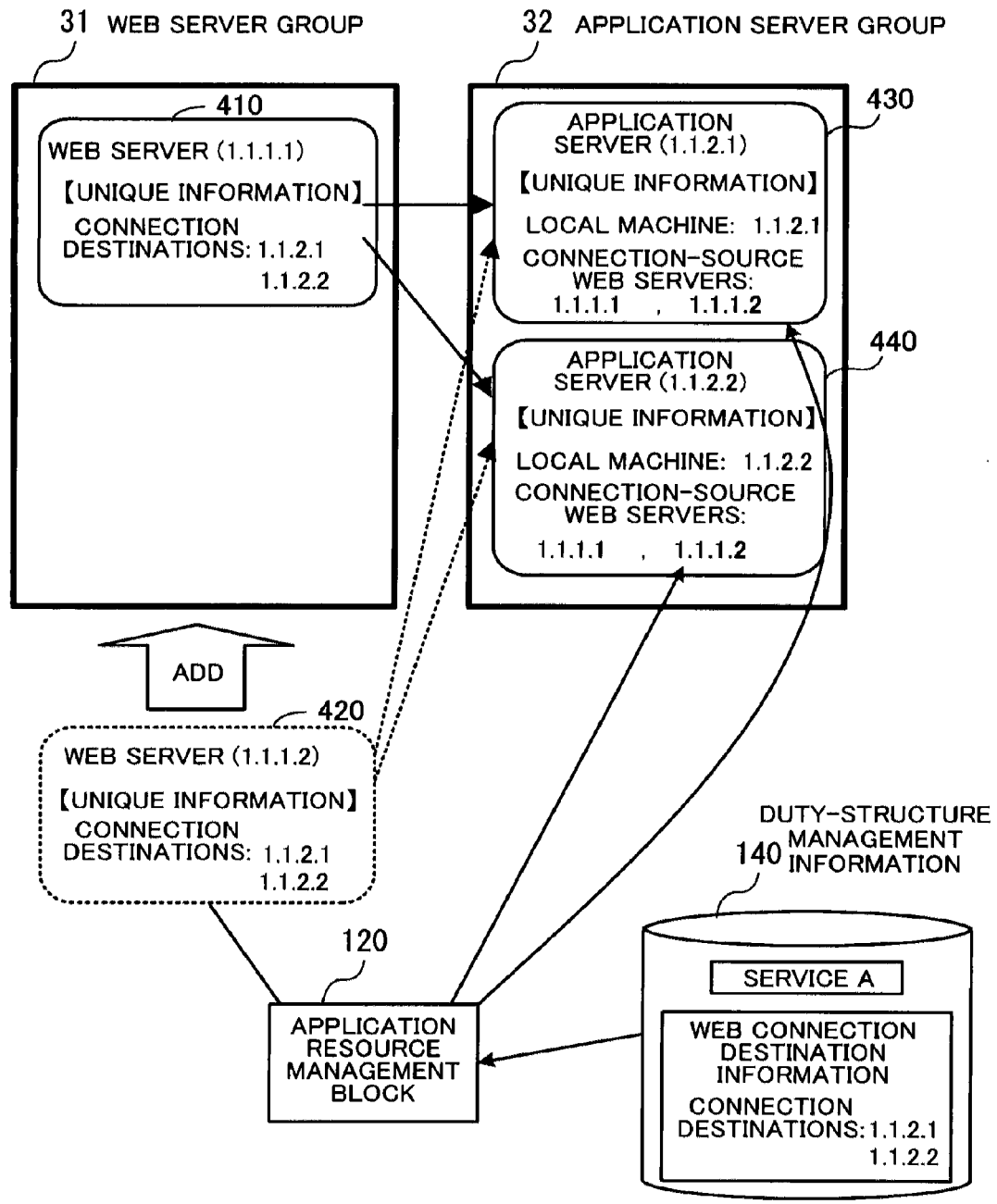
FIG. 17 is a view showing an example of unique information setup in web server addition processing.

FIG. 17 is a view showing an example of unique information setup in web server addition processing. The example shown in FIG. 17 assumes that the managed server computer 420 is added to the web server group 31 while the web server group 31 includes just the managed server computer 410. It is also assumed that the application server group 32 includes two managed server computers, 430 and 440.

In this example, connection destinations are specified as unique information in the web server function of the managed server computer 420 to be added. The connection destinations are the IP addresses "1.1.2.1" and "1.1.2.2" of the managed server computers 430 and 440 included in the application server group 32.

The unique information of the managed server computers 430 and 440 includes the IP address of the web server at the connection source. Before the managed server computer 420 is added, the IP address "1.1.1.1" of the managed server computer 410 is specified as the connection source of the application server. After the managed server computer 420 is added to the web server group 31, the IP address "1.1.1.2" of the managed server computer 420 is additionally specified as a connection source of the application servers of the managed server computers 430 and 440.

Figure 18:
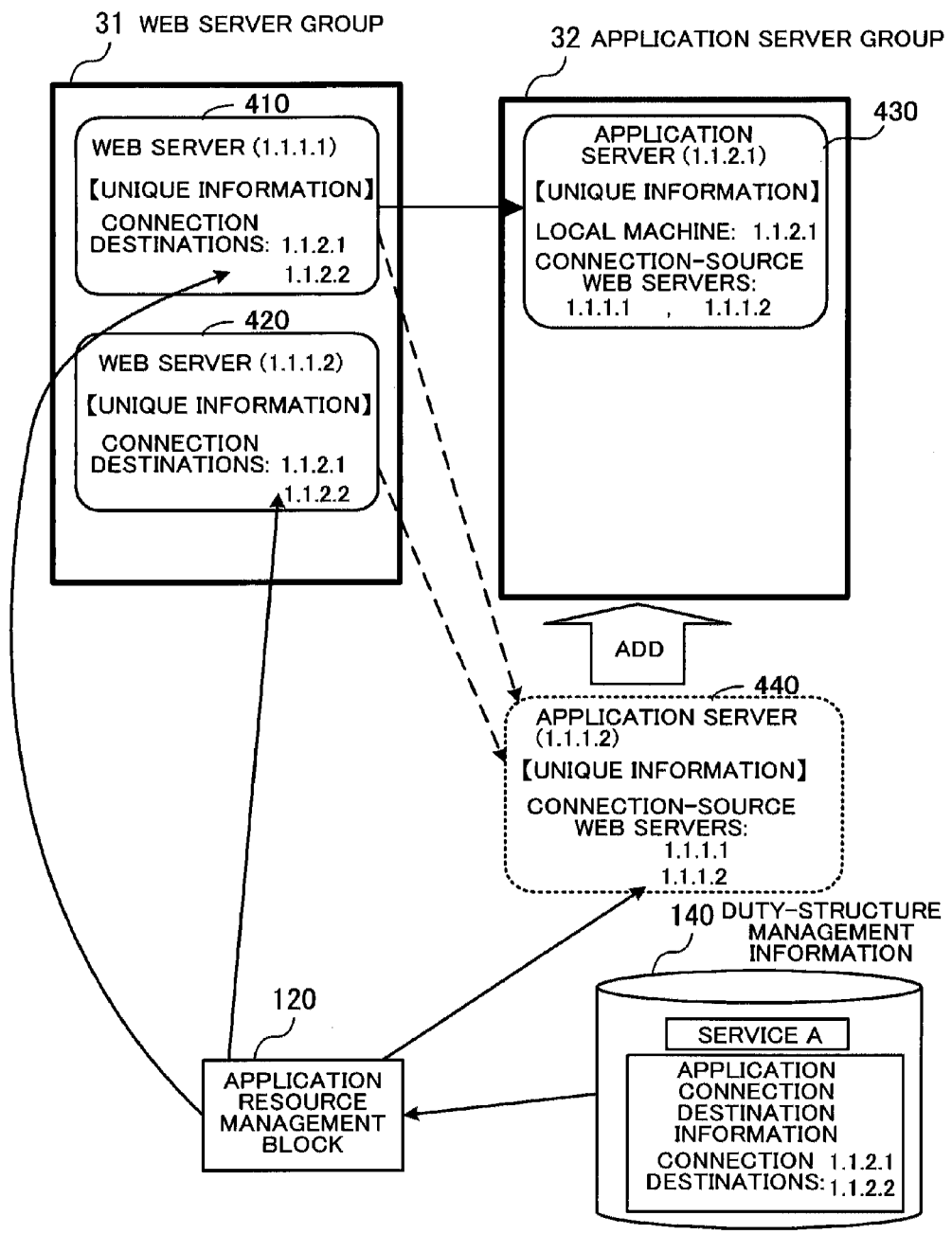
FIG. 18 is a view showing an example of unique information setup in application server addition processing.

FIG. 18 is a view showing an example of unique information setup in application server addition processing. The example shown in FIG. 18 assumes that the application server group 32 includes just the managed server computer 430, and the managed server computer 440 is added to the application server group 32. It is also assumed that the web server group 31 includes two managed server computers, 410 and 420.

In this example, connection sources are specified as unique information for the application server function of the managed server computer 440 to be added. The connection sources are the IP addresses "1.1.1.1" and "1.1.1.2" of the managed server computers 410 and 420 included in the web server group 31.

The IP address of the application server at the connection destination is specified as the unique information of the managed server computers 410 and 420. Before the managed server computer 440 is added, the IP address "1.1.2.1" of the managed server computer 430 is specified as the connection source of the web server. After the managed server computer 440 is added to the application server group 32, the IP address "1.1.2.2" of the managed server computer 440 is additionally specified as a connection destination of the web servers of the managed server computers 410 and 420.

In this way, the processing to add a server to a server group causes unique information to be specified in the managed server computers included in another server group having a processing request relationship with the server group. Consequently, correct processing request relationships can be kept even after a server is added to a service group in a system providing a service by a multistage processing function (such as a web server and an application server).

When a server is deleted from a server group, processing to delete unique information must be performed.

Figure 19:
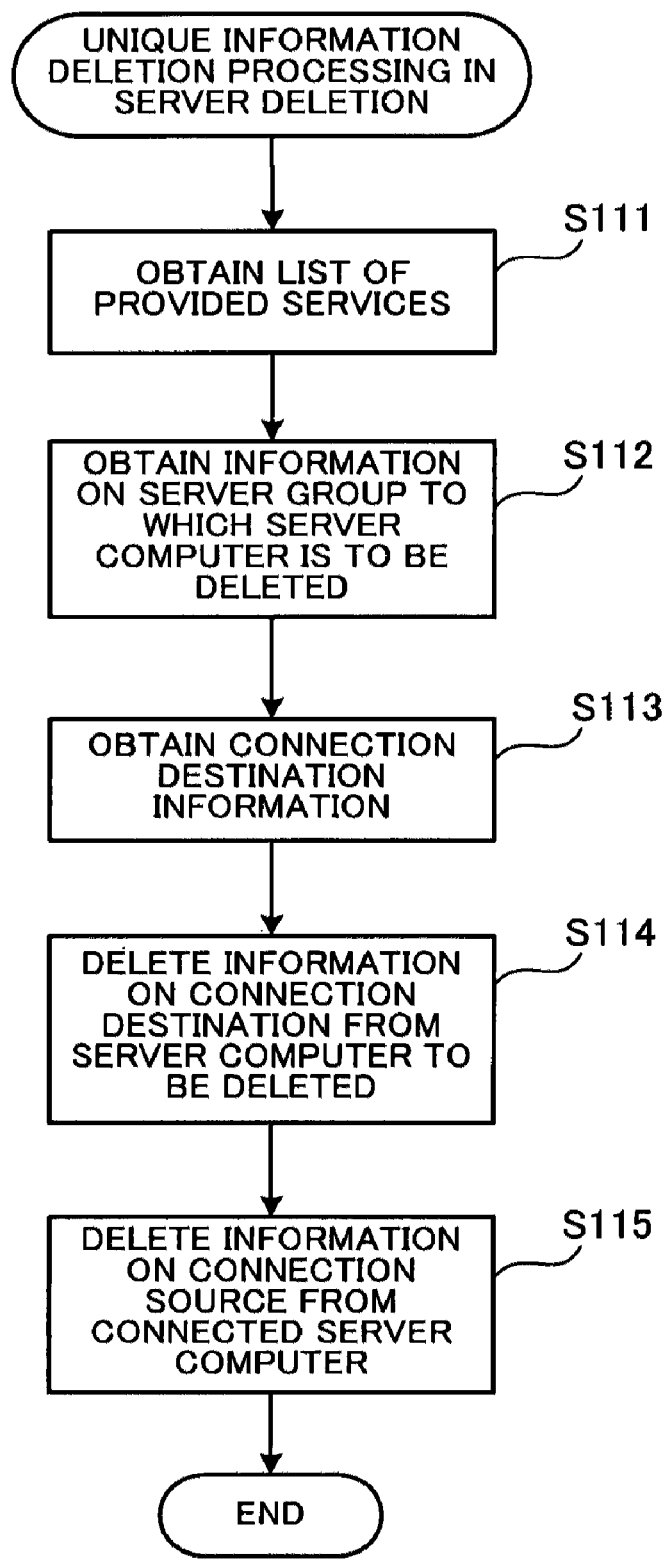
FIG. 19 is a flow chart showing a procedure of unique information deletion processing in server deletion processing.

FIG. 19 is a flow chart showing a procedure of unique information deletion processing in server deletion processing. The processing shown in FIG. 19 will next be described in order of step number.

Step S111: The application resource management block 120 obtains a list of services provided by the system, from the duty-structure management information 140.

Step S112: The application resource management block 120 obtains information on a service provided in the server group to which a managed server computer should be deleted, from the duty-structure management information 140.

Step S113: The application resource management block 120 obtains information on another managed server computer to which the managed server computers included in the target server group are connected (connection destination information), from the duty-structure management information 140.

Step S114: The application resource management block 120 deletes the information (IP address and the like) on the connected computer from the unique information of the managed server computer to be deleted. For instance, if a web server is deleted, the IP address of the application server is deleted from the unique information of the managed server computer to be deleted.

Step S115: The application resource management block 120 deletes the information (IP address and the like) on the managed server computer to be deleted, from the unique information of the managed server computer at the connection destination.

Figure 20:
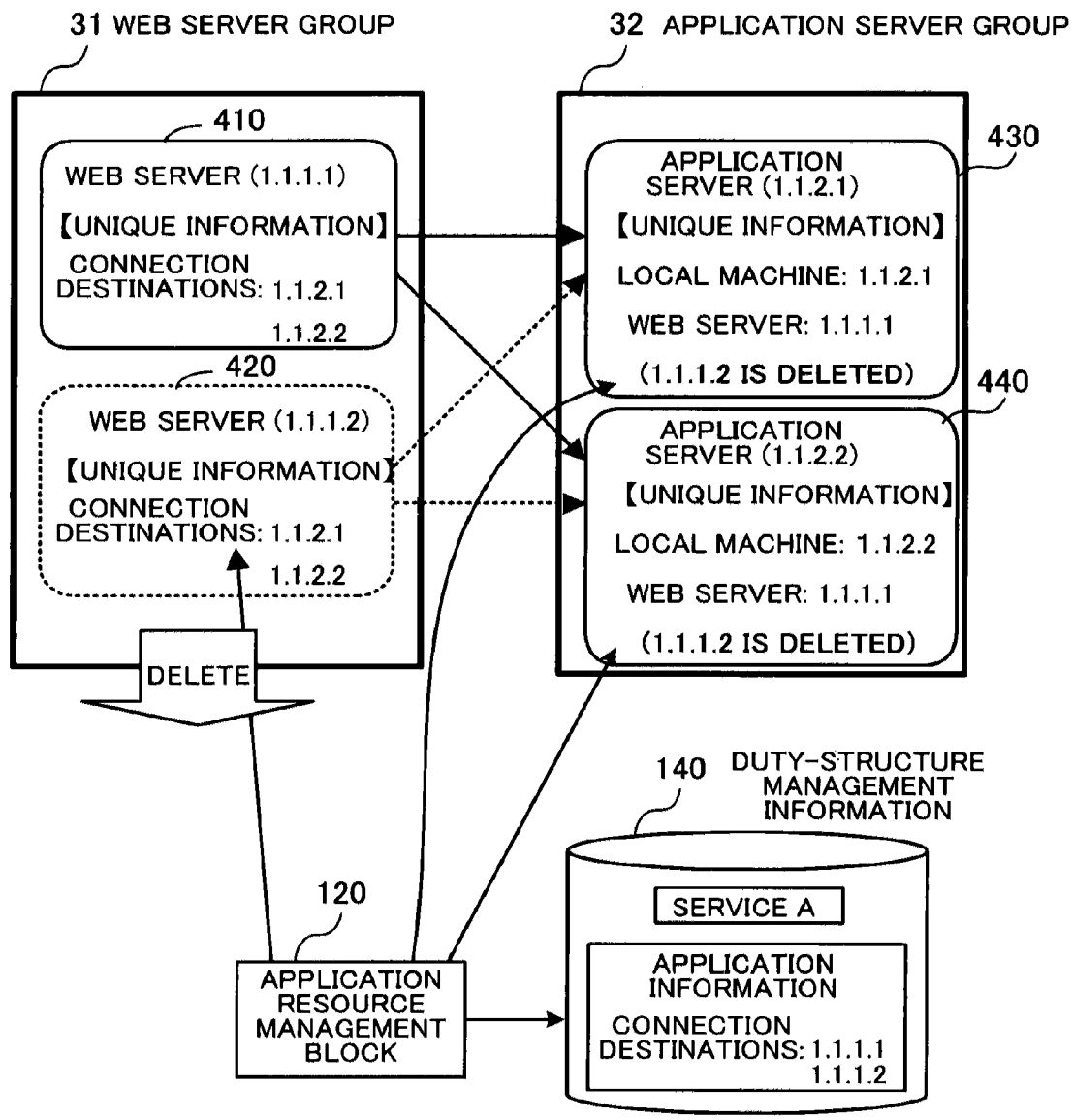
FIG. 20 is a view showing an example of unique information deletion in web server deletion processing.

FIG. 20 is a view showing an example of unique information deletion in web server deletion processing. The example shown in FIG. 20 assumes that the web server group 31 includes the managed server computer 410 and the managed server computer 420, and the managed server computer 420 is deleted from the web server group 31. It is also assumed that the application server group 32 includes two managed server computers, 430 and 440.

In this example, information on the connection destinations is deleted from the unique information of the web server function of the managed server computer 426 to be deleted. In the example shown in FIG. 20, the IP addresses "1.1.2.1" and "1.1.2.2" of the managed server computers 430 and 440 included in the application server group 32 are deleted. Then, information on the managed server computer 420 is deleted from the list of managed server computers included in the web server group 31, by the server group management function of the application resource management block 120.

Before the managed server computer 420 is deleted, the unique information of the managed server computers 430 and 440 includes the IP address "1.1.1.1" of the managed server computer 410 and the IP address "1.1.1.2" of the managed server computer 420 as the connection sources of the application server. After the managed server computer 420 is deleted from the web server group 31, the IP address "1.1.1.2" of the managed server computer 420 is deleted from the connection sources of the application servers of the managed server computers 430 and 440.

Figure 21:
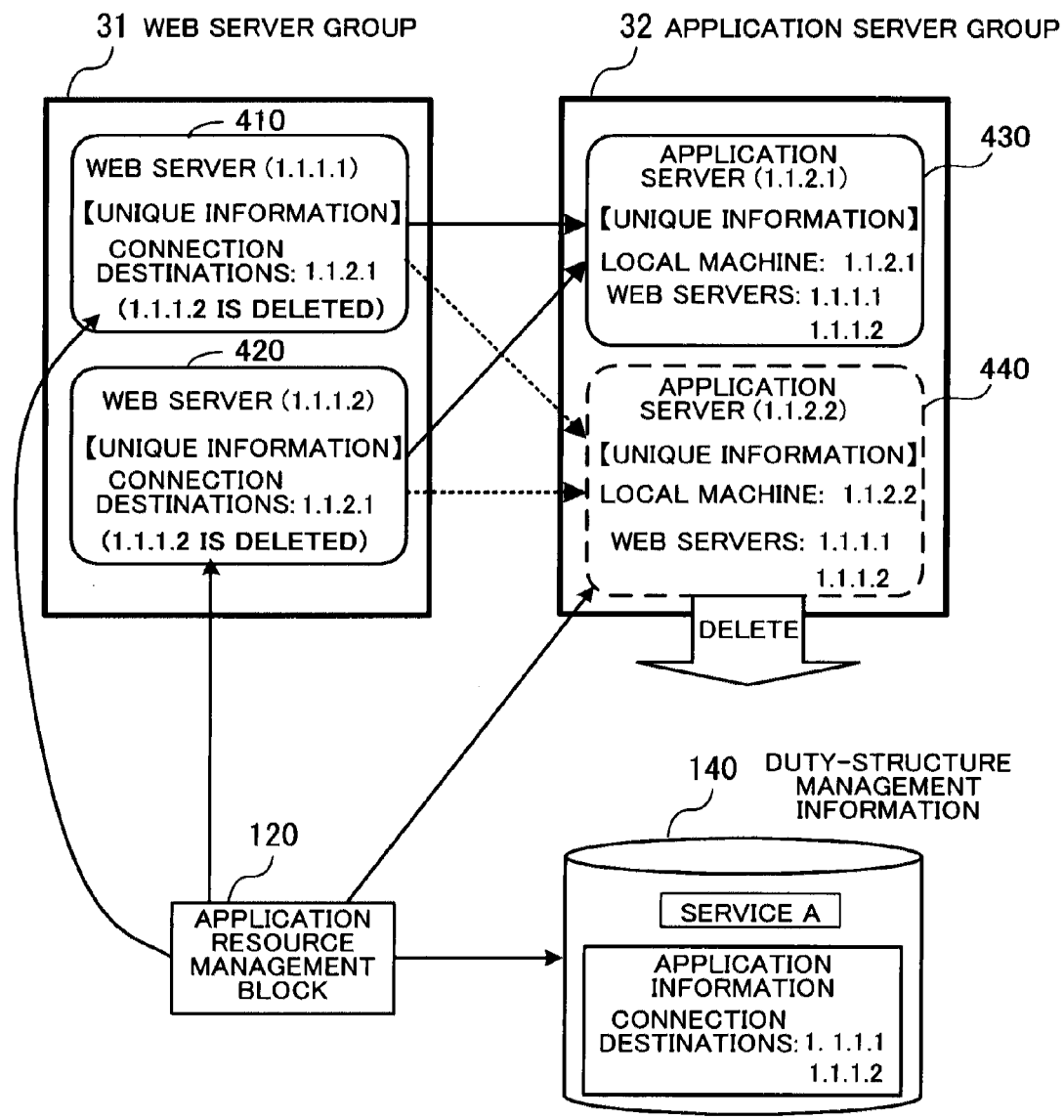
FIG. 21 is a view showing an example of unique information setup in the application server addition processing.

FIG. 21 is a view showing an example of deleting unique information in the application server deletion processing. In the example shown in FIG. 21, it is assumed that the application server group 32 includes the managed server computer 430 and the managed server computer 440, and the managed server computer 440 is deleted from the application server group 32. It is also assumed that the web server group 31 includes two managed server computers, 410 and 420.

In this example, connection sources are deleted from the unique information of the application server function of the managed server computer 440 to be deleted. In the example shown in FIG. 21, the IP addresses "1.1.1.1" and "1.1.2" of the managed server computers 410 and 420 included in the web server group 31 are deleted.

Before the managed server computer 440 is deleted, the unique information of the managed server computers 410 and 420 includes the IP address "1.1.2.2" of the managed server computer 430 as the connection destination of the web server.

After the managed server computer 440 is deleted from the application server group 32, the IP address "1.1.2.2" of the managed server computer 440 is deleted from the connection destinations of the web servers of the managed server computers 410 and 420.

When a managed server computer is added to or deleted from a server group, the image data is copied, and unique information editing processing, such as setup, deletion, and the like of the IP address, is performed on the basis of the connection relationships among server applications, as described above. This enables a system for providing a service by means of a multistage server application to expand or reduce the function of each server group automatically.

Because a managed server computer can be automatically added to or deleted from a server group, the use of the server can be automatically changed (repurposing).

Figure 22:
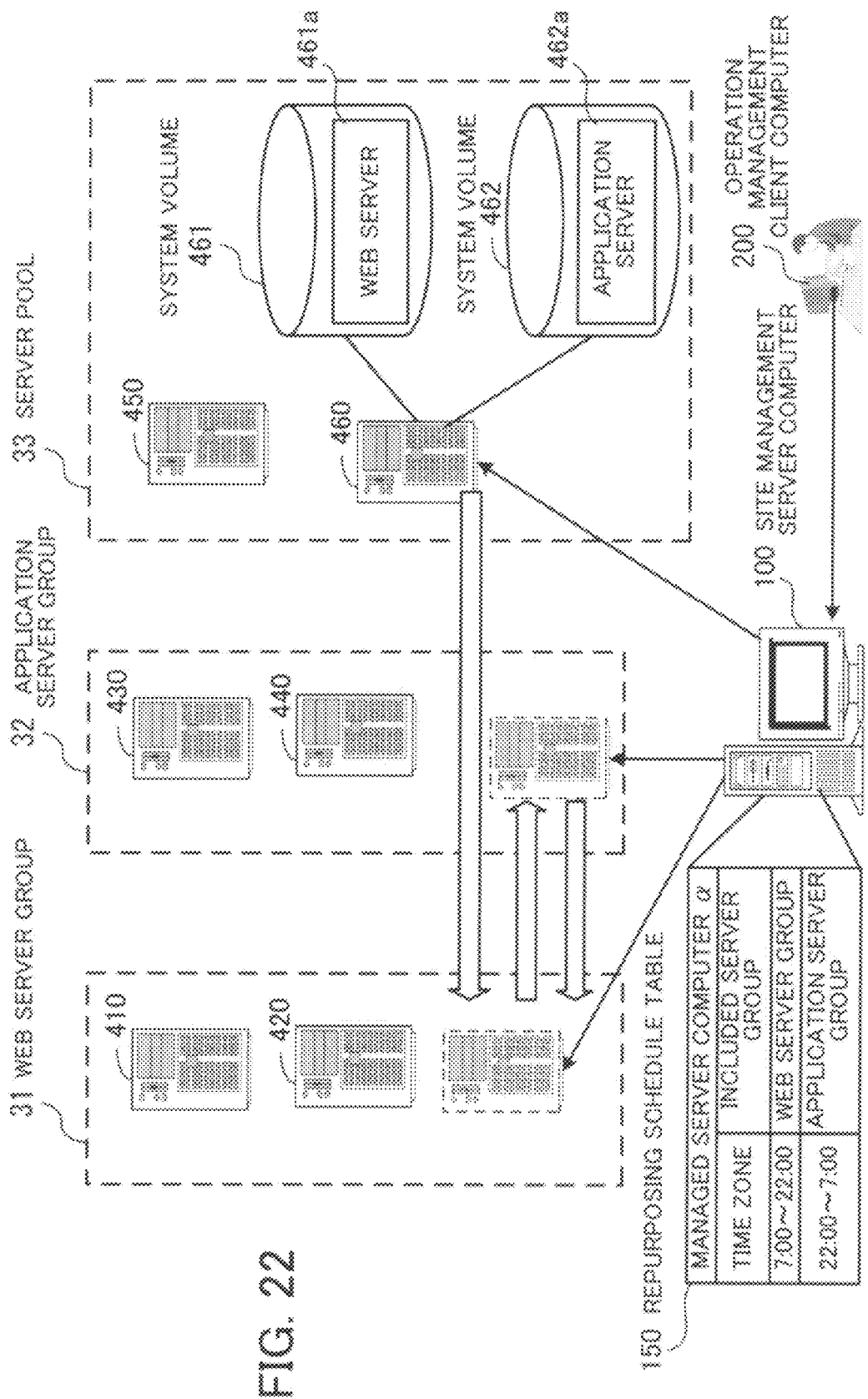
FIG. 22 is a conceptual diagram of repurposing processing.

FIG. 22 is a conceptual diagram of repurposing processing. In the example shown in FIG. 22, the managed server computer 460 in the server pool 33 is the target of repurposing. The managed server computer 460 is provided with two system volumes 461 and 462. The system volumes 461 and 462 have different OSs.

The administrator operates the operation management client computer 200 to give an instruction to incorporate a web server 461a and an application server 462a, to the managed server computer 460. The application resource management block 120 of the site management server computer 100 incorporates the web server 461a (distributes the data and sets up the operating environment) into one system volume 461 and incorporates the application server 462a into the other system volume 462, of the managed server computer 460.

In addition, the administrator can operate the operation management client computer 200 to define a repurposing schedule of the managed server computer 460 in the site management server computer 100. The definition is held as a repurposing schedule table 150 in the site management server computer 100.

In the repurposing schedule table 150, the server group including the managed server computer 460 in each time zone is defined in association with the identification information (such as the server name) of the managed server computer 460. The example shown in FIG. 22 indicates that the managed server computer 460 is included in the web server group 31 in a time zone from 7:00 to 22:00 and is included in the application server group 32 from 22:00 to 7:00 next morning.

The application resource management block 120 of the site management server computer 100 switches the use of the managed server computer 460 with reference to the repurposing schedule table 150. The application resource management block 120 adds the managed server computer 460 to the web server group 31 at 7:00. The application resource management block 120 then performs remote control of the managed server computer 460 to activate the OS from the system volume 461. Now, the managed server computer 460 starts providing the service of the web server 461a.

The application resource management block 120 deletes the managed server computer 460 from the web server group 31 at 22:00 and adds it to the application server group 32. The application resource management block 120 reactivates the managed server computer 460 by remote control and starts the OS from the system volume 462. Now, the managed server computer 460 starts providing the service of the application server 462a.

Because the use of the managed server computer can be easily changed in this way, if the amount of processing of a service function varies greatly with time, the service can be provided automatically by a greater number of managed server computers in a time zone in which the amount of processing becomes excessively large.

In the example shown in FIG. 22, the use of the managed server computer is changed according to the schedule. The use of the managed server computer can also be changed according to an operation input from the operation management client computer 200.

The above-described processing functions can be implemented by a computer. In that case, a program describing the processing of the functions to be implemented by the site management server computer is provided. When the program is executed on the computer, the processing functions are implemented on the computer. The program describing the processing can be recorded on a computer-readable recording medium. Computer-readable recording media include magnetic recording devices, optical discs, magneto-optical recording media, and semiconductor memories. The magnetic recording devices include hard disk drives (HDDs), flexible disks (FDs), and magnetic tapes. The optical discs include DVDs (digital versatile discs), DVD-RAMs (random access memories), CD-ROMs (compact disc read only memories), CD-Rs/RWs (recordables/rewritables). The magneto-optical recording media include MOs (magneto-optical disks).

When the program is distributed, DVDs, CD-ROMs, and other portable recording media having the program recorded on them are sold. The program may also be stored in a memory of a server computer and transferred from the server computer to another computer through a network.

The computer for executing the program stores the program recorded on a portable recording medium or the program transferred from the server computer, in a memory of itself. The computer then reads the program from its memory and executes programmed processing. The computer can also read the program directly from the portable recording medium and execute the programmed processing. Moreover, the computer can execute the processing of the program successively each time the program transferred from the server computer is received.

According to the present invention, unique information of a mating server computer having a processing request relationship is set up in a server computer to be added after the image data is stored. This allows a server computer to be added automatically in a system for providing a service by a plurality of servers working in cooperation with one another.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium having recorded a server management program for grouping and managing a plurality of server computers in server groups, the server management program causing a computer to perform a procedure comprising:
   collecting disk image data from a server computer included in each of the server groups and storing the disk image data in a first memory;
   obtaining from the first memory, in response to an instruction to add a server computer of the server computers to an addition-target server group of the server groups, the disk image data collected from the addition-target server group;
   storing the obtained disk image data in the server computer to be added, wherein the disk image data includes data of an operating system on which a server application for providing a service to the server computers is incorporated, and wherein the storing stores the disk image data in a system volume differing from a system volume which has already been provided in the server computer to be added;
   storing in a second memory, for each server group, unique information of the server computers in other server group which have a processing request relationship with the server computers in said each server group;
   setting up, by consulting the second memory, the unique information of a mating server computer having a processing request relationship, in the server computer to be added, and further setting up the unique information of the server computer to be added in the mating server computer having the processing request relationship with the server computer to be added;
   outputting, according to a schedule table in which a server group that should include a server computer of the server computers for a period of time is determined in advance, an instruction to switch the server group at the time when the group that includes the server computer is changed; and
   reactivating the server computer for which the server group is changed, from a system volume corresponding to the server group to which the server computer belongs after the switching, according to the instruction that is outputted.

2. The computer-readable recording medium according to claim 1, wherein the setting up of the unique information sets up the address information of the mating server computer having the request relationship, as the unique information of the mating server computer having the processing request relationship with the server computer to be added.

3. The computer-readable recording medium according to claim 1, wherein the configuration setup means-setting up of the unique information sets up address information of the server computer to be added as the unique information of the server computer to be added, ~ in the mating server computer.

4. The computer-readable recording medium according to claim 1, wherein the collecting uses, as the first memory, a memory in an apparatus connected to a network protected by a firewall together with the server computers.

5. A server management method for grouping and managing a plurality of server computers in server groups, the server management method comprising:
   collecting disk image data from a server computer included in each of the server groups and storing the disk image data in a first memory;
   obtaining from the first memory, in response to an instruction to add a server computer of the server computers to an addition-target server group of the server groups, the disk image data collected from the addition-target server group;
   storing the obtained disk image data in the server computer to be added, wherein the disk image data includes data of an operating system on which a server application for providing a service to the server computers is incorporated, and wherein the storing stores the disk image data in a system volume differing from a system volume which has already been provided in the server computer to be added;
   storing in a second memory, for each server group, unique information of the server computers in other server group which have a processing request relationship with the server computers in said each server group;

setting up, by consulting the second memory, the unique information of a mating server computer having a processing request relationship, in the server computer to be added, and further setting up the unique information of the server computer to be added in the mating server computer having the processing request relationship with the server computer to be added;

outputting, according to a schedule table in which a server group that should include a server computer of the server computers for a period of time is determined in advance, an instruction to switch the server group at the time when the group that includes the server computer is changed; and reactivating the server computer for which the server group is changed, from a system volume corresponding to the server group to which the server computer belongs after the switching, according to the instruction that is outputted.

6. A server management apparatus for grouping and managing a plurality of server computers in server groups, the server management apparatus comprising:

a first memory to store data;

a second memory to store, for each server group, unique information of the server computers in other server group which have a processing request relationship with the server computers in said each server group; and a processor configured to perform a procedure incluing:

collecting disk image data from a server computer included in each of the server groups and storing the disk image data in the first memory, obtaining from the first memory, in response to an instruction to add a server computer of the server computers to an addition-target server group of the server groups, the disk image data collected from the addition-target server group, storing the obtained disk image data in the server computer to be added, wherein the disk image data includes data of an operating system on which a server application for providing a service to the server computers is incorporated, and wherein the storing stores the disk image data in a system volume differing from a system volume which has already been provided in the server computer to be added, setting up, by consulting the second memory, the unique information of a mating server computer having a processing request relationship, in the server computer to be added, and further setting up the unique information of the server computer to be added in the mating server computer having the processing request relationship with the server computer to be added, outputting, according to a schedule table in which a server group that should include a server computer of the server computers for a period of time is determined in advance, an instruction to switch the server group at the time when the group that includes the server computer is changed; and reactivating the server computer for which the server group is changed, from a system volume corresponding to the server group to which the server computer belongs after the switching, according to the instruction that is outputted.

* * * * *